United States Patent [19]
Körner et al.

[11] Patent Number: 5,251,269
[45] Date of Patent: Oct. 5, 1993

[54] MULTI-LAYER NEURAL NETWORK MODELLED AFTER THE STRIATE CORTEX FOR RECOGNIZING VISUAL PATTERNS

[75] Inventors: Edgar Körner, Ilmenau, German Democratic Rep.; Hiroshi Shimizu, Tokyo, Japan; Ichiro Tsuda, Tokyo, Japan; Hiroaki Tanaka, Tokyo, Japan

[73] Assignee: Research Development Corporation of Japan, Tokyo, Japan

[21] Appl. No.: 774,376

[22] Filed: Oct. 10, 1991

Related U.S. Application Data

[63] Continuation of Ser. No. 219,576, Jul. 15, 1988, abandoned.

[30] Foreign Application Priority Data

Jul. 15, 1987 [JP] Japan .................. 62-176959

[51] Int. Cl.⁵ .............. G06K 9/62; G01L 1/06; G06F 15/00
[52] U.S. Cl. .............. 382/15; 395/22; 395/24
[58] Field of Search .............. 382/14, 15; 364/513, 364/274.9, 276.6; 395/21, 22, 23, 24, 25, 26, 27

[56] References Cited

U.S. PATENT DOCUMENTS

| | | | |
|---|---|---|---|
| 3,950,733 | 4/1976 | Cooper et al. | 382/15 |
| 4,599,693 | 7/1986 | Denenberg | 382/15 |
| 4,748,674 | 5/1988 | Freeman | 382/15 |
| 4,774,677 | 9/1988 | Buckley | 382/15 |

*Primary Examiner*—David K. Moore
*Assistant Examiner*—Michael Cammarata
*Attorney, Agent, or Firm*—Kerkam, Stowell, Kondracki & Clarke

[57] ABSTRACT

A pattern recognition system includes at least one pair of basic associative units each having at least first and second unit ports for receiving pattern signal groups, respectively and a third unit port for outputting a pattern signal group. The pattern recognition system has characteristics of the type of pattern recognition carried out by living organisms. Each of the basic units operates to derive weighting values for respective signals of the pattern signal groups inputted to the first and second unit ports of the basic unit itself in accordance with the degree of consistency between a previously given weighting pattern and respective patterns specified by the pattern signal groups inputted to the first and second unit ports of the basic unit itself. Each of the basic units also operates to modulate the respective signals of the pattern signal groups inputted to the first and second unit ports of the basic unit in accordance with the derived weighting values and to totalize the modulated signals so as to form an output signal outputted form the third unit port of the basic unit itself. The third unit port of one of the basic unit pair is coupled to the first unit port of the other basic unit, and the third unit port of the other basic unit is coupled to the second unit port of the one basic unit. Thus, the third unit port of one of the basic unit pair gives an recognition output.

9 Claims, 23 Drawing Sheets

(A)     (B)     (C)     (D)

INTENSITY
INPUT SIGNAL

SUPPRESS CHANNELS IN R0

ASSOCIATION OF RELATED PATTERN IN R1 (CALLED FEEDBACK PATTRN)

R0 PATTERN AFTER FEEDBACK IS STABILIZED

↓

(L)

PATTEN MEMORIZED IN R2

(E)   (F)   (G)

INTENSITY
SUPPRESS
CHANNELS
IN RO PER
NEXT STRONG
INTENSITY

ASSOCIATION
OF RELATED
PATTERN IN
R1
(CALLED
 FEEDBACK
 PATTRN)

RO PATTERN
AFTER
FEEDBACK
IS STABILIZED (M)

PATTEN
MEMORIZED
IN R2

MULTI-LAYER NEURAL NETWORK MODELLED AFTER THE STRIATE CORTEX FOR RECOGNIZING VISUAL PATTERNS

This is a continuation of application Ser. No. 07/219,576, filed Jul. 15, 1988, now abandoned.

BACKGROUND OF THE INVENTION

1. Field of the Invention

The present invention relates to a pattern recognition system, and more specifically to a general pattern recognition system capable of extracting features from not only an image input such as characters and graphic patterns but also any event which varies in time or in space.

2. Description of related art

At present, so-called pattern recognition systems are widely used in an industrial field, for example as apparatuses for reading letters, systems for sorting components or parts and systems for inspecting products. A feature of recognition method common to the conventional systems is to firstly extract various characteristics, which are commonly contained in a group of objects to be recognized, from the input pattern data, and then to categorize the input pattern on the basis of the extracted characteristics.

For this purpose, a processing part of most recognition systems comprises a digital processor and a special circuit which quantitatively extracts specific characteristics, such as a high speed Fourier transformation circuit. In addition, a program for the digital processor must be exclusively designed for each object to be recognized. Such specialization of the recognition system both in hardware and in software has been intended to meet a primary industrial demand for a high-speed recognition.

On the other hand, the specialization of the recognition system makes it necessary to design an system and a program for each recognition object category. As a result, the related techniques are more specialized, and design and modification works have become more complicated. Furthermore, the complication of categorizing processing will lower the reliability of recognition, resulting in more difficult quality control of the pattern recognition systems themselves and in increase of manufacturing cost of the pattern recognition systems.

In addition, users cannot avoid the following disadvantages on the technical point and the cost. First, the technical information on objects themselves to be recognized, which should be held only at the user's side, inevitably flows out to makers of the pattern recognition systems. Secondly, the user is ceaselessly forced to replace the system in use with a new model with improved function every time a model changes.

As described above, the pattern recognition system has even encountered with disadvantages of the specialization and complication.

In this situation, efforts have been made and are now made to simulate a pattern recognition method of a living body.

In response to various stimuli from an external environment, a living body interprets them according to the experience by making use of a brain and a nervous plexus. In fact, however, the living body can not only give one interpretation with reference to its experience and memory but also can give a certain interpretation to inexperienced matters.

The structure of the brain and nervous plexus having the above-mentioned capacity is partially specialized for each recognition object. Most part of the structure, however, is some kind of large-scaled nervous system composed of a large number of single-structural neuropils interconnected with each other. According to the cranial nerve physiology, each of nerve cells organizing the neuropil not only receives the electrical stimuli from several thousands to several ten thousands of other nerve cells, but also generates electrical impulses to itself and to a large number of other nerve cells. The generation of the electrical impulses is called "firing".

The condition of such firing of nerve cells depends on the internal condition of the cells themselves and the stimuli inputted. On the other hand, since it is considered that the whole of a brain executes a certain recognition processing, it can be understood that the firing of even a single nerve cell indicates the result of a partial interpretation processing.

As mentioned above, the nerve cells interchange the electrical impulses each other. The method of applying such impulses can be divided into two manners: the first is to restrain or suppress the firing and the second is to facilitate the firing. The brain can, therefore, be regarded as being a "bang-bang control circuit" having positive feedback control circuits and negative feedback control circuits in a mixed manner.

Furthermore, in the case of a human being, the brain is quite complicated, and composed of more than $10^8$ of nerve cells. It is known from the anatomical viewpoint that these cells are interconnected each other, not in a random way but in a regular way in which the same connection patterns composed of several tens to several thousands cells are repeated.

The above description shows the characteristics of the hardware of the brain as a pattern recognition system.

The description will be hereinafter devoted to the software aspect of the action of the brain. The change in spatial and time distribution of the firing of the neuropils caused by the stimuli from the inside and outside of a living body, seems to show the progress of the interpretation processing in the brain, that is, the recognition software and the transfer of the information processed therein.

In general, the features of a brain different from a digital processor are that: (1) the program and data are not stored separately, (2) data processing is executed in completely parallel at various local neuropils and the output can be obtained in harmony as a whole.

A detailed description is made hereinafter for the first feature that program and data are not stored separately. In a digital processor, the program and the data should be regarded to be substantially stored separately, because the processor clearly distinguishes between the data and the instruction in the course of execution of processing based on the program and the data although they are stored mixedly in a memory device. On the other hand, a brain is neither a digital processor of such stored program type nor a discrete logical circuit realized in a conception opposite to that of the above programmed digital processor. The neuropils have a special structure so that the progress of data processing may produce the new experience and consequently a new data processing structure.

As regards the second feature that the parallel data processings on neuropils are in harmony as the whole, a total evaluation is given by the following characteristics. Since the respective firing conditions in local groups of nerve cells are in cooperation to produce one overall harmony, each group of local nerve cells has somehow the information concerning the whole condition and the object to be recognized. Each nerve cell group receives the information from other nerve cell groups with a time delay in comparison with the information which the nerve cell group itself receives directly from an external. Such a feature is a kind of pattern recognition in a wide sense including not only visual recognition but also other recognitions such as audio recognition, and moreover, has no substantial disadvantages inherent to the conventional pattern recognition system of the digital processor type.

Namely, since the store of recognition experiences automatically produces an improved recognition software for possible next recognition operation, it is not necessary to externally give a new software for a possible next object. In addition, although the brain or each neuropil is composed of repeated units of the same structure on the viewpoint of hardware, the brain can cope with the change of the recognition function.

SUMMARY OF THE INVENTION

Accordingly, it is an object of the present invention to provide a pattern recognition system which has overcome the above mentioned defect of the conventional one.

Another object of the present invention is to provide a pattern recognition system having software and hardware which little depend upon the kind or category of an object to be recognized, which system makes it possible for manufacturers to produce a small number of kinds of pattern recognition systems at a mass-production scale, allowing a lower cost an elevated reliability and a shortened period from order to delivery, and also which system makes it possible for users to accumulate information concerning the object to be recognized without dependency upon an external such as a manufacturer, and to elevate the function of the system with only simple addition of a unit having the same structure.

The above and other objects of the present invention are achieved in accordance with the present invention by a pattern recognition system comprising at least one pair of basic associative units each having at least first and second unit ports for receiving pattern signal groups, respectively and a third unit port for outputting a pattern signal group, each of the basic units operating to derive weighting values for respective signals of the pattern signal groups inputted to the first and second unit ports of the basic unit itself in accordance with the degree of consistency between a previously given weighting pattern and respective patterns specified by the pattern signal groups inputted to the first and second unit ports of the basic unit itself, each of the basic units also operating to modulate the respective signals of the pattern signal groups inputted to the first and second unit ports of the basic unit in accordance with the derived weighting values and to totalize the modulated signals so as to form an output signal outputted form the third unit port of the basic unit itself, the third unit port of one of the basic unit pair being coupled to the first unit port of the other basic unit, and the third unit port of the other basic unit being coupled to the second unit port of the one basic unit, the third unit port of one of the basic unit pair giving an recognition output.

The above and other objects, features and advantages of the present invention will be apparent from the following description of preferred embodiments of the invention with reference to the accompanying drawings.

EMBODIMENTS

The inventors have originated the pattern recognition system in accordance with the present invention, paying attention to the above mentioned remarkable pattern recognition capacity and their characteristic structure of a living body, and on the basis of the recent fruit of inventors' theoretical research of a signal processing in the brain examined by taking into consideration the fine structure of the cerebrum.

Therefore, before explaining an embodiment of the present invention, we will first explain the signal processing in the cerebrum examined by taking into consideration the fine structure of the cerebrum.

Figure 1:
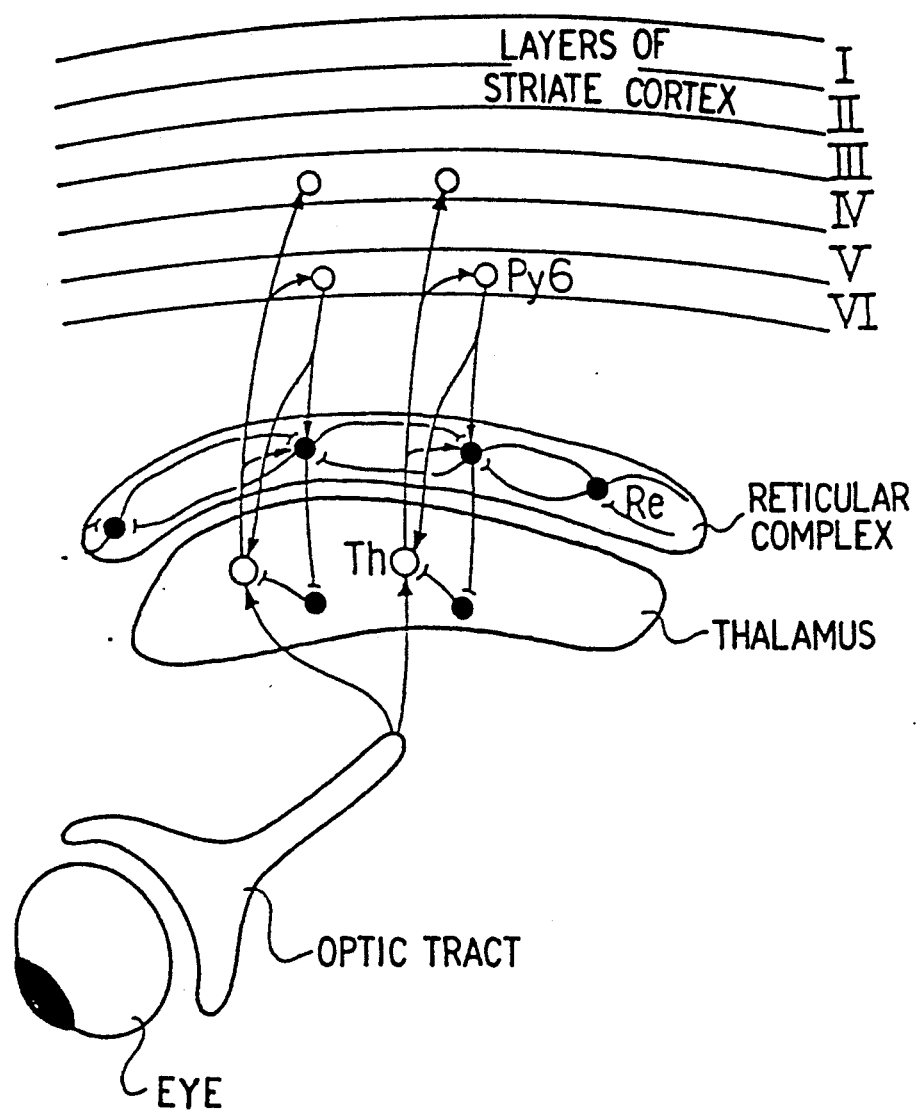
FIG. 1 is a formalized illustration of a perceptual input to a striate cortex of the cerebrum.
Figure 2:
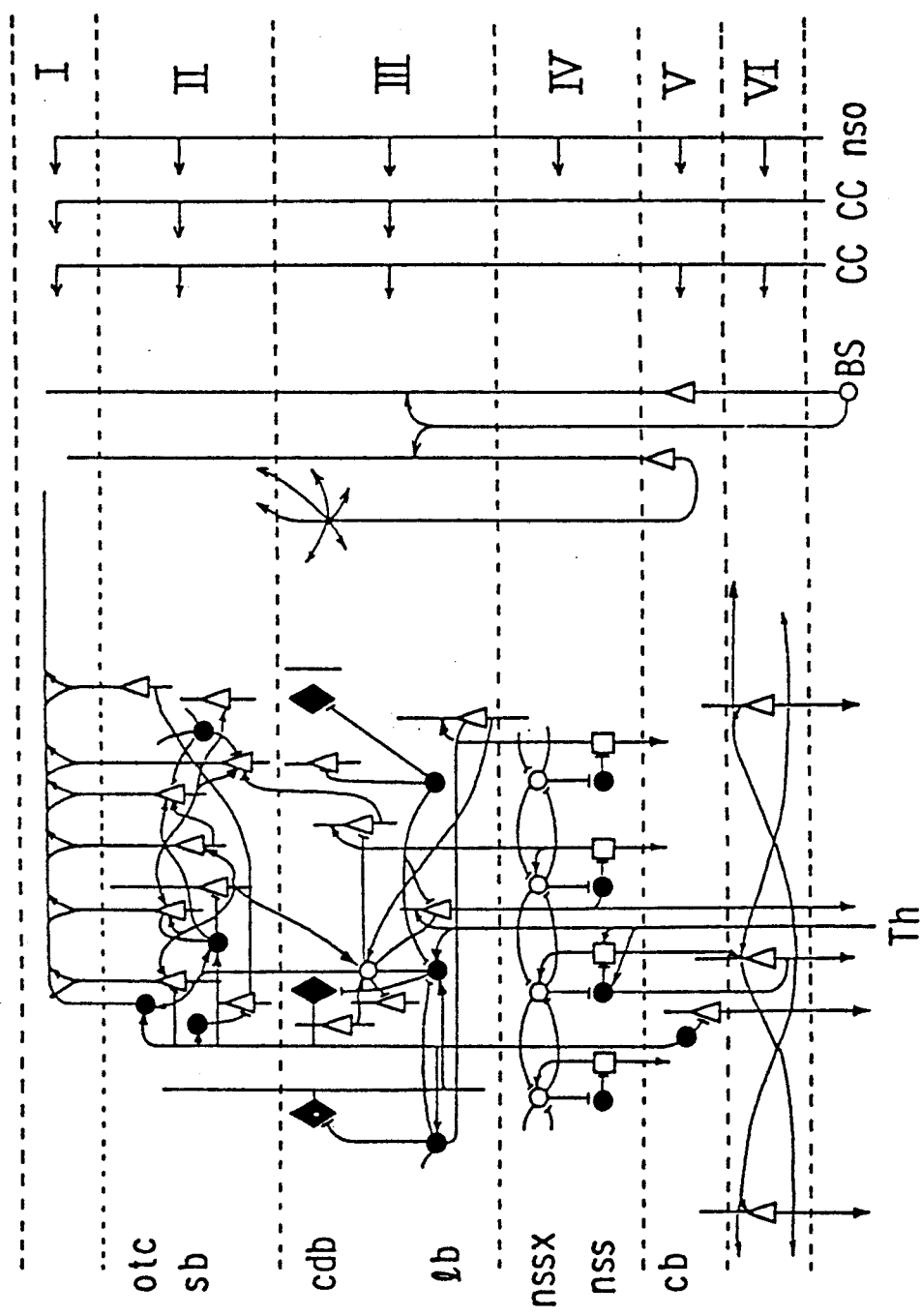
FIG. 2 is an illustration of a layered structure of the cerebrum striate cortex having six layers.

(A) According to a recent result of an anatomical examination, a perceptual input to a cerebrum is supplied through a thalamus and a reticular complex to the striate cortex as shown in FIG. 1. The striate cortex has a layered structure having six layers I to VI, which is illustrated in FIG. 2. In FIG. 2, various symbols such as white circles, black circles, rectangles, triangles (pyramidal block) and rhombuses indicate units or assemblies of neuropils, respectively. Particularly, in FIG. 2 and the succeeding figures, the triangles (pyramidal block) has an input indicated by an apex of the triangular block. Furthermore, in FIG. 2 and the succeeding figures, each of lines terminating at an arrow indicates an excitation input, and each of lines terminating at a T-shape indicates restraint or suppression input.

The cortex is composed of a large number of cell groups, the cells of each group being located perpendicular to the layers of cortex and being relatively closely coupled to each other to form a column having a diameter of about 30 μm. In addition, some number of columns are aggregated to form a macro-column of 500 to 1000 μm in size.

(B) "Parallel in Sequence" mechanism

Figure 3:
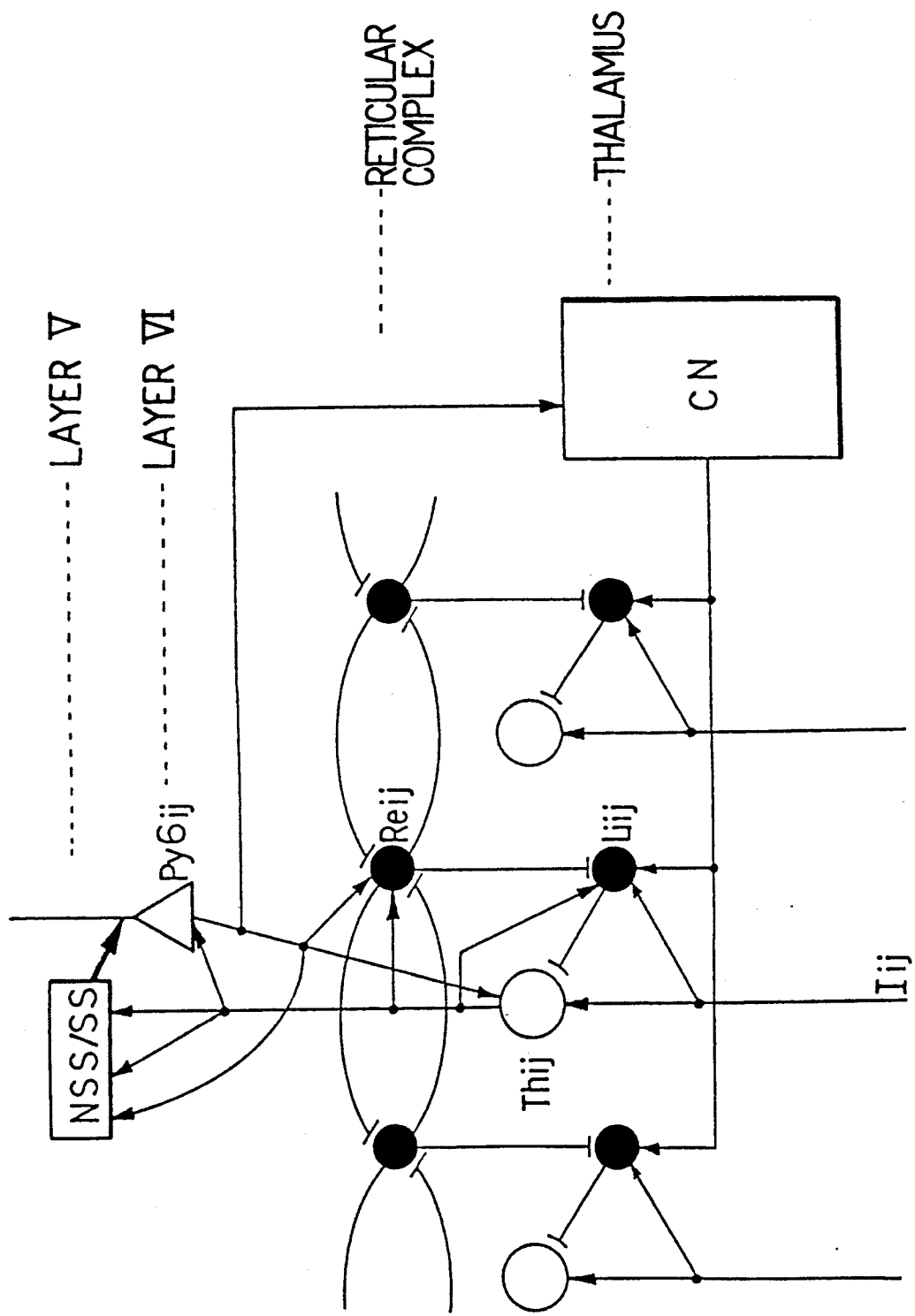
FIG. 3 is a simple illustration of intercell connections between the thalamus, the reticular cortex and the fourth to sixth layers of the striate cortex.

Referring to FIG. 3, there is illustrated the connection of cells among the a thalamus, a reticular complex and the layers VI to IV of the striate cortex.

Figure 4:
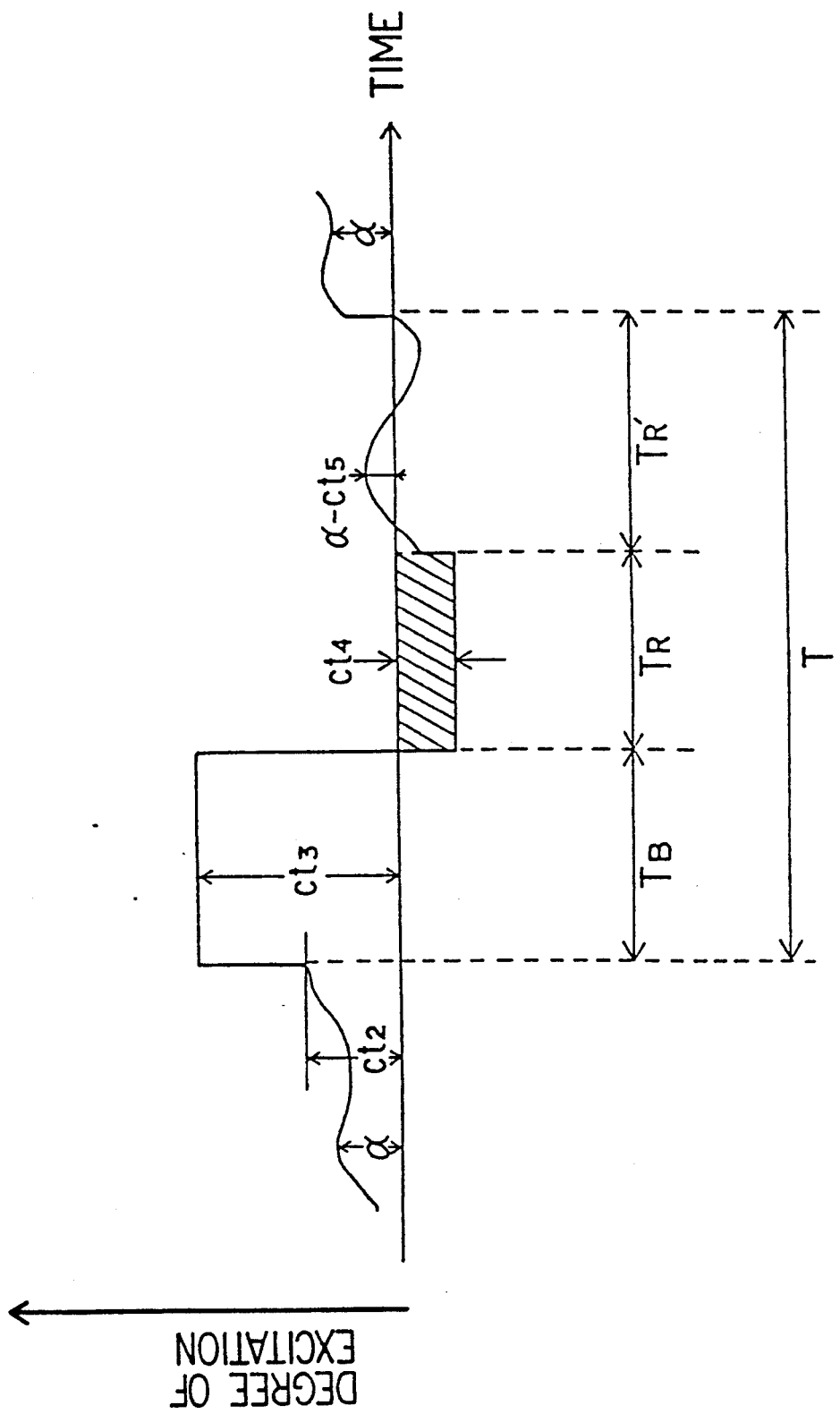
FIG. 4 illustrates a momentary excitation of the circuit composed of the Th-Li-Re cells.

According to Llians and Johnson (1982, 1984 and 1984) and Steriade and Deschenes (1984), a circuit composed of Th-Li-Re shows a temporary excitation. Namely, as shown in FIG. 4, an input Iij is integrated until the input exceeds a certain value, and then, if the input exceeds the certain value, a large output is generated for some constant period of time $T_B$, which is followed by an insensitive period having constant times $T_R$ and $T_{R'}$ Specifically, the Re cell will excite in response to an output of the Th cell, and the Th cell itself is positively fed back through the Li cell to more excite, by causing the Li cell to restrain the restraint output to the Th cell. In addition, each of the Re cells outputs a restraint output to adjacent Re cell as seen from FIG. 3, so that the Th-Li-Re circuit will restrain the excitation of adjacent Th-Li-Re circuit. Further, a control neuron CN regionally restrains the excitation of the neuro-circuit through the Li cells.

As a result of various considerations, the dynamics of the shown neuro-circuit can be expressed by the following equation:

$$Th_{ij}^k = Bu\,[b1 \cdot Th_{ij}^{k-1} + w1 \cdot I_{ij}^{k-1} +$$

$$\sum_z Cl_{ijz} \cdot Py6_{ijz}^{k-1} - W4 \cdot Li_{ij}^{k-1}\,]$$

$$Li_{ij}^k = F\,[a4 \cdot CN^{k-1} + a5 \cdot \sum_{u,v \in \Lambda} Th_{uv}^{k-1} + a6 \cdot \sum_{u,v \in \Lambda} Th_{uv}^{k-1} +$$

$$b3 \cdot Li_{ij}^{k-1} - a7 \cdot Re_{ij}^{k-1}\,]$$

$$Re_{ij}^k = F\,[a1 \cdot \sum_z Py6_{xjz}^{k-1} + a2 \cdot Th_{ij}^{k-1} +$$

$$b2 \cdot Re_{ij}^{k-1} - a3 \cdot \sum_{x,y \in \Omega} Re_{xy}^{k-1}\,]$$

$$CN^k = \sum_{xjz} Py6_{xjz}^{k-1}$$

where $F[\alpha] = \alpha$ if $0 \leq \alpha \leq ct_1$ $\quad 0$ if $\alpha < 0$ $\quad ct_1$ if $\alpha > ct_1$ $Bu[\alpha] = \alpha$ if $\alpha > ct_2$ $\quad P$ if $\alpha \geq ct_2$ at $t = k$ and $\quad t < k + T_B + T_R + T_{R'}$ where $P = ct_3$ for $k \leq t < k + T_B$ $\quad P = ct_4$ for $\quad k + T_B \leq t < k + T_B + T_R$ $\quad P = \alpha + ct_5$ for $\quad k + T_B \leq t < k + T_R + T_{R'}$ and where $Th_{ij}^k$, $Li_{ij}^k$, $Re_{ij}^k$, $Py6_{ij}^k$, and $CN^k$ respectively indicate the status of the firing of the cells Th, Li, Re and Py6 and the control neuron CN located at a position (i,j) and at a time $k_n$;

$a_1$ to $a_7$, $b_1$ to $b_3$ and $w_1$ to $w_4$ are constants, respectively;

$Cl_{ij}$ is a spatially weighted constant of coupling between the cells $Py6_{ij}$ and $Th_{ij}$;

$ct_1$ to $ct_5$ are thresholds; and $I_{ij}$ is an input from an external.

Figure 5:
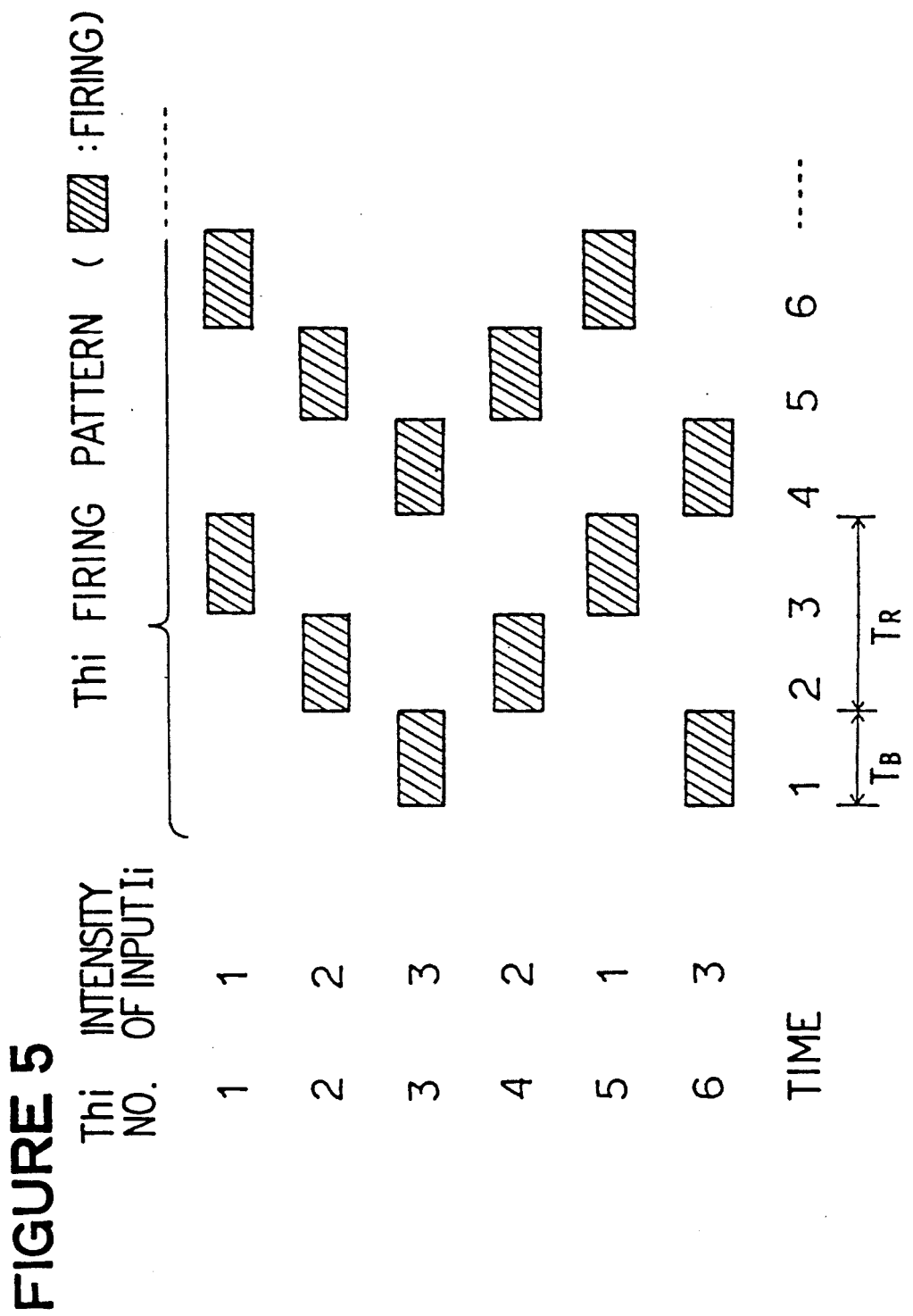
FIG. 5 illustrates a firing condition of the circuit composed of the Th-Li-Re cells.

As the result of a simulation of the signal processing in the circuit expressed by the above equation, we found that the circuit has the dynamics illustrated in FIG. 5 and explained below. In FIG. 5, a leftmost column indicates the cell number of the cells $Th_i$ and a column rightwardly adjacent to the leftmost column indicates the intensity of the input $I_i$ to the cell $Th_i$. Hatched rectangles indicate the firing status, and the time is elapsed from left to right in FIG. 5.

(1) The cells $Th_i$ (third and sixth Th cells in the example shown in FIG. 5) receiving the input of all the inputs $I_i$ having the largest intensity (the degree of intensity "3" in the example shown in FIG. 5) will at a first place be fired. At this time, the Th cells adjacent to the third and sixth cells are restrained from firing. As a result, a pattern of firings which correspond to the largest intensity inputs is generated (a time 1 in the example shown in FIG. 5).

(2) After a time $T_B$ has elapsed, the Th cells which have firstly fired, terminates its firing and enters an insensitive period. As a result, the cells $Th_i$ (second and fourth Th cells in the example shown in FIG. 5) receiving the input having the second larger intensity (the degree of intensity "2" in the example shown in FIG. 5) will be fired.

(3) Thereafter, similarly to the step (2), a pattern of firing corresponding to a pattern of more weak inputs is successively generated.

(4) When the Th cells which have firstly fired, restore from their insensitive period, the firing process will be repeated from the step (1).

Thus, the characteristics in parallel in time of the input pattern ($I_i$) is converted into a firing pattern of the Th cells which changes in the time sequence. This is called "Parallel in Sequence" mechanism. To what degree the input pattern is finely analyzed to a time sequence pattern will fundamentally depend upon a ratio of $T_B$ and $T_R$ (in FIG. 5, $T_R$ indicates $T_R + T_R'$). Namely, if $T_R$ is much longer than $T_B$, a more detailed analysis can realized.

(C) "Variable-byte Formation" Mechanism

As shown in FIG. 3, the excitation of the Th-Li-Re circuit is detected by the layers IV to VI of the striate cortex. In addition, the Th-Li-Re circuit is coupled to the striated cortex so that a positive feedback is applied to the Th cell. Therefore, if an appropriate feedback in accordance with an input pattern is applied from the striated cortex to the Th cell, the pattern of firing of the Th cells will be rearranged in accordance with the input pattern.

Figure 6:
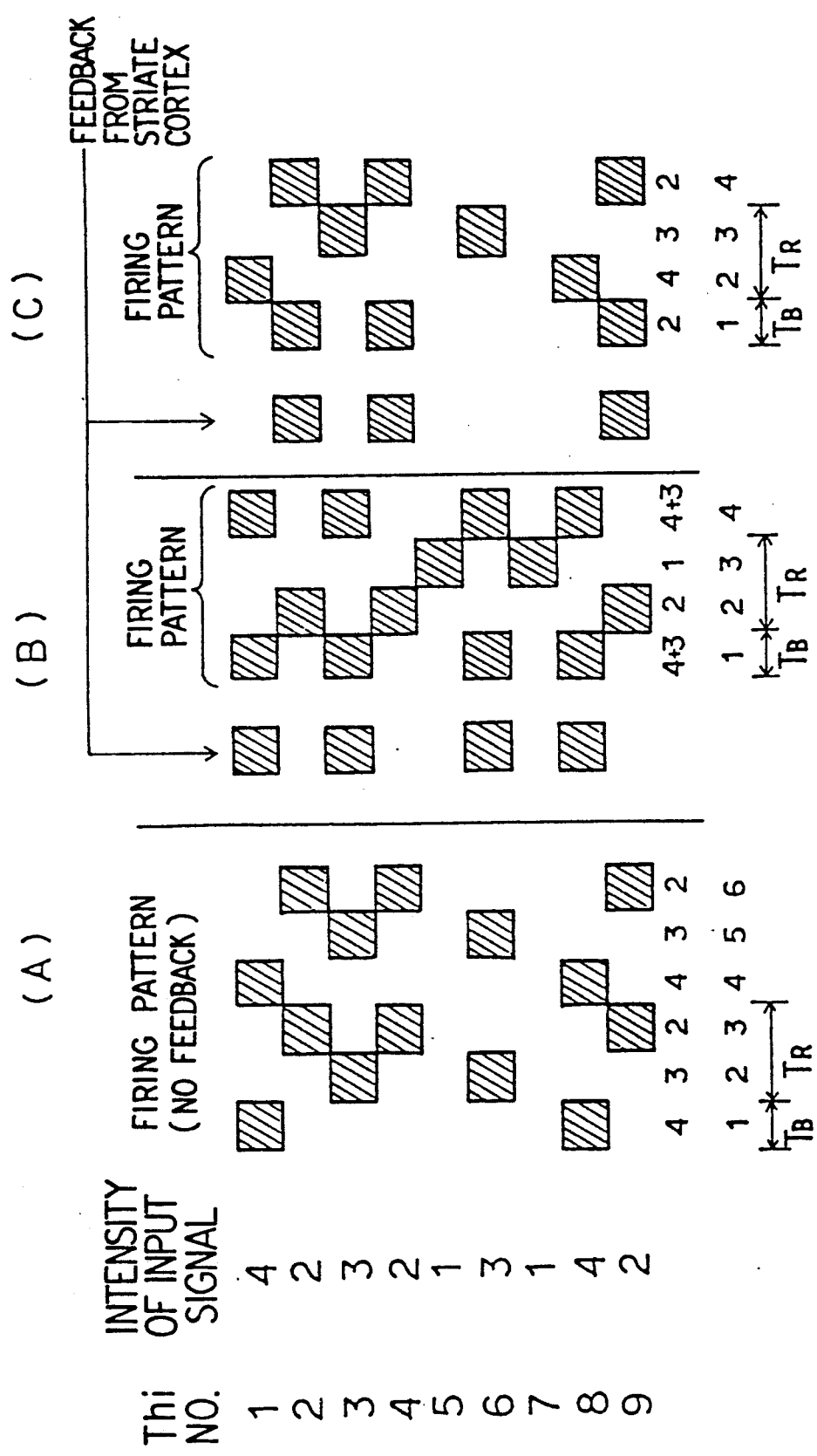
FIG. 6 illustrates a sequential change of firing condition in the circuit composed of the Th-Li-Re cells in the case that no feedback is applied and in the case that the feedback is applied to the circuit in two different manners.

For example, if no feedback is applied from the striate cortex as shown in FIG. 6(A), the TH cells will fire in the order of the intensity of the input pattern. In the shown example, the pattern of firing having the intensity of "2" or more can be detected because of the ratio of $T_B$ to $T_R$ as shown.

If the firing of the cells which have fired at a high priority is suppressed as shown in FIG. 6(B), it is possible to detect a feature having even a small intensity of "1".

Further, if a feedback is applied so as to facilitate an input of a weak intensity, only a specific feature can be preferentially detected. In the example shown in FIG. 6(C), the pattern of the intensity "2" is preferentially detected.

Thus, various features existing in parallel in time can be converted into various time sequence patterns under different feedback rules. This mechanism will be called a "Variable-byte Formation".

(D) Structure and Function of Striate Cortex

Figure 7:
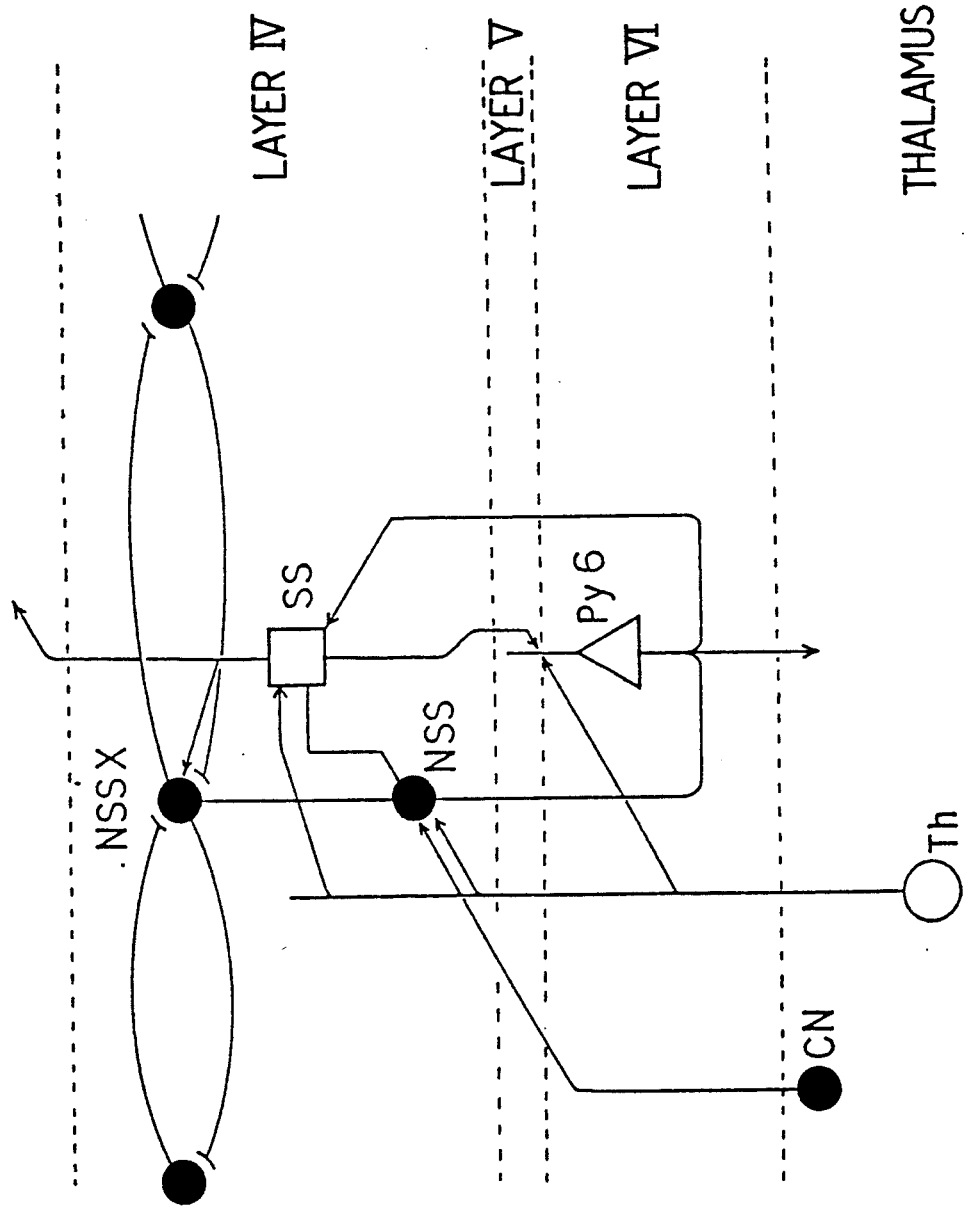
FIG. 7 is a detailed diagram of intercell connections between the fourth to sixth layers of the striate cortex shown in FIG. 2.

FIG. 7 illustrates a cell coupling seen in the cell layer IV of the striate cortex shown in FIG. 2. As seen from FIG. 7, the cell layer IV is composed of NSSX cells and NSS cells coupled in a manner similar to that of the thalamus and the reticular complex as mentioned above, and coupled to cells of the layers III and VI so as to mutually act. In addition, each of the NSSX cells is coupled to adjacent NSSX cells so as to mutually restrain the excitation of the the adjacent NSSX cells. Therefore, the mutual restraint of excitation will sharpen the spatial pattern of excitation.

As mentioned above, the triangular block, which is representative of the Py cell (pyramidal cell), has an input indicated by an apex of the triangular block.

As a result of various considerations, the operation of the shown neuro-networks can be expressed by the following equation:

$$SS_{ijz}^k = F\left[ b6 \cdot SS_{ijz}^k + \sum_m C9_{ijmijz} \cdot Py6_{ijm}^{k-1} + \sum_{n,l} C10_{nlijz} \cdot Th_{nl}^{k-1} - NSS_{ijz}^{k-1} \right]$$

$$NSS_{ijz}^k = F\left[ CN^{k-1} + \sum_{u,v} a16 \cdot Th_{uv}^{k-1} + \sum_{n,m,l} a17 \cdot Py6_{mnl}^{k-1} - NSSX_{ijz}^{k-1} \right]$$

$$NSSX_{ijz}^k = F\left[ a18 \cdot S_{ijz}^{k-1} - \sum_m a19 \cdot NSSX_{ijm}^{k-1} \right]$$

where $SS_{ijz}^k$, $NSS_{ijz}^k$, and $NSSX_{ijz}^k$ respectively indicate the status of the firing of the (z)th cells SS, NSS and NSSX located at a position (i,j) and at a time k; $a_{16}$ to $a_{19}$ and $b_6$ are constants, respectively; and $c_9$ and $c_{10}$ are spatially weighted constants of coupling between the cells.

Figure 8:
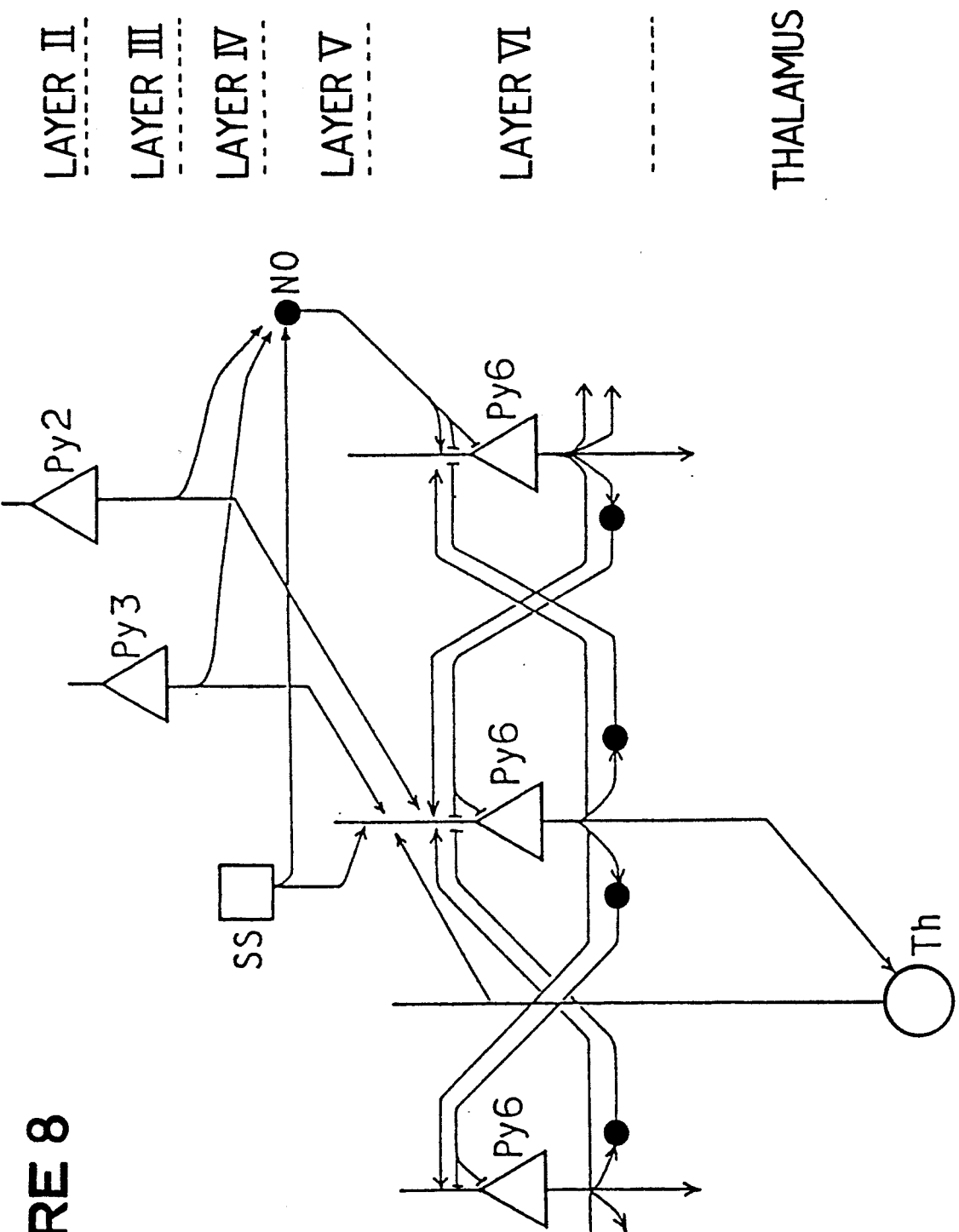
FIG. 8 is a detailed connection diagram of the circuit composed of large size pyramidal cells included in the sixth layer of the striate cortex shown in FIG. 2.

Referring to FIG. 8, there is illustrated an coupling diagram of a neuro-network composed of pyramidal cells Py6 which can be seen in the layer VI shown in FIG. 2. The Py6 cells are mutually coupled in an excitation manner and in a restraint manner so as to form one layer.

Figure 9:
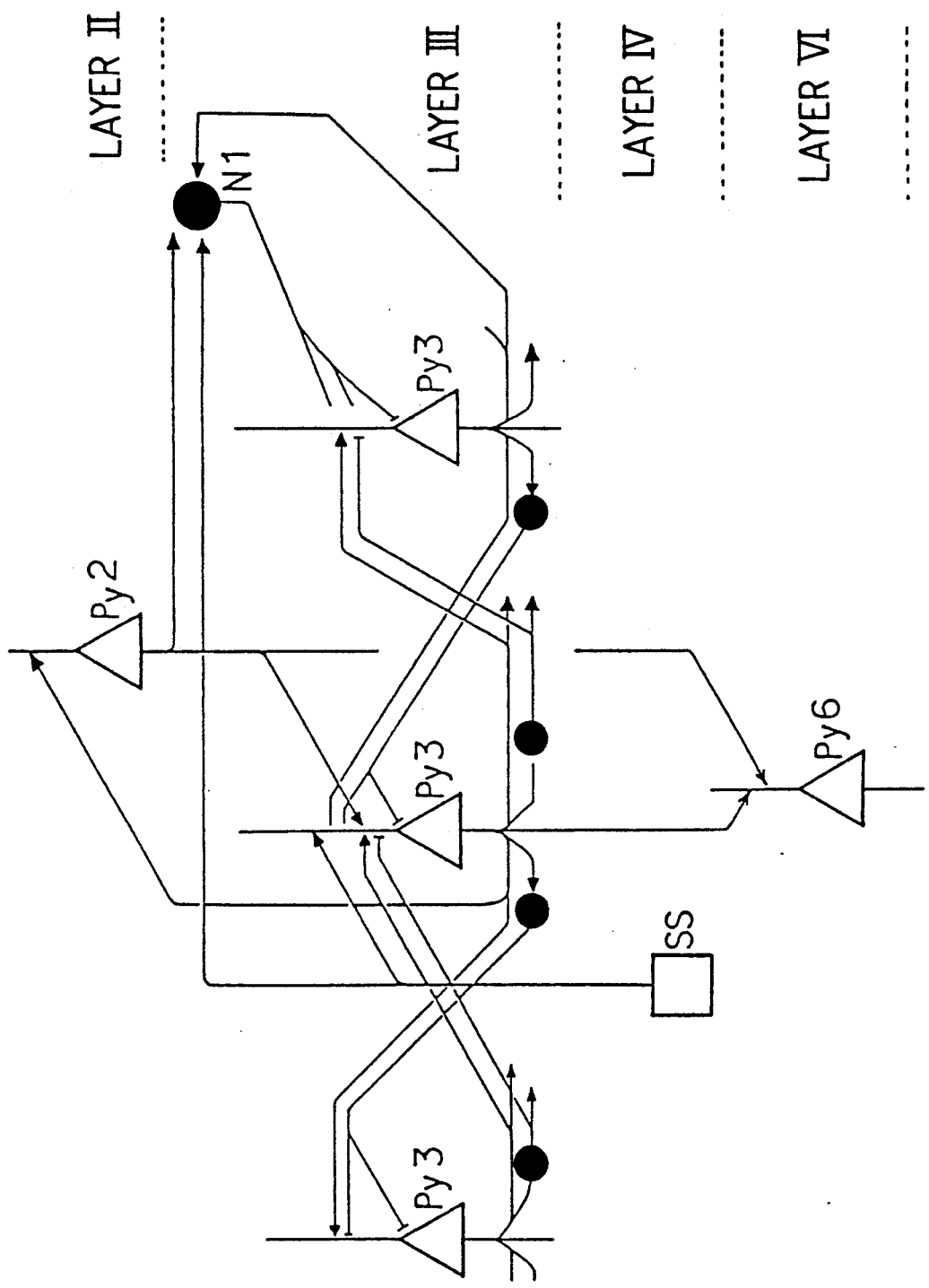
FIG. 9 is a detailed connection diagram of the circuit composed of pyramidal cells included in the third layer of the striate cortex shown in FIG. 2.

Although the shown network indicates a local connection, this coupling will also provide an associative memory as will be described hereinafter. This network can achieve an operation expressed by the following equation.

$$Py6_{ijz}^k = F[b4 \cdot Py6_{ijz}^{k-1} + a8 \cdot Th_{ij}^{k-1} + a9 \cdot Py3_{ijz}^{k-1} + \sum_n C4_{ijz} \cdot Py6_{ijz}^{k-1} + \sum_m C8_{ijzijm} \cdot SS_{ijz}^{k-1} + \sum_x C2_{ijzx} \cdot Py2_{ijzx}^{k-1} - \sum_{x,y,u} C3_{ijzxyu} \cdot Py6_{ijz}^{k-2} - N0^{k-1}]$$

$$N0^k = \sum_{ijz} (SS_{ijz}^{k-1} + Py3_{ijz}^{k-1}) \cdot a11 + \sum_{ijzx} a12 \cdot Py2_{ijzx}^{k-1}$$

where $Py6_{ijz}^k$, $Py3_{ijz}^k$, and $Py2_{ijzx}^k$ respectively indicate the status of the firing of the (z)th or (z, x)th cells Py6, Py3 and Py2 located at a position (i,j) and at a time k; $a_8$, $a_9$ and $b_4$ are constants, respectively; $c_8$, $c_2$ and $c_3$ are spatial constants of coupling between cells weighted as the associative memory; and $N0^k$ is indicative of the status of the excitation of the control neuron which regionally restrains the excitation of the neuro-network at a time k;

Turning to FIG. 9, there is illustrated an coupling diagram of a neuro-network composed of pyramidal cells Py3 which can be seen in the layer III shown in FIG. 2. The Py3 cells are considered to form an associative memory, whose operation can be expressed by the following equation.

$$Py3_{ijz}^k = F[b5 \cdot Py3_{ijz}^{k-1} + a12 \cdot SS_{ijz}^{k-1} +$$
$$\sum_x C5_{ijzx} \cdot Py2_{ijzx}^{k-1} + \sum_{u,v,w} C6_{uvwijx} \cdot Py3_{uvw}^{k-1} -$$
$$\sum_{x,y,u} C7_{xyuijz} \cdot Py3S_{xyu}^{k-2} - N1^{k-1}]$$

$$N1^k = \sum_{ijz} a13 \cdot SS_{ijz}^{k-1} + \sum_{ijzx} a14 \cdot Py2^{k-1} + \sum_{u,v,w} a15 \cdot Py3_{uvw}^{k-1}$$

where $a_{12}$ to $a_{15}$ and $b_5$ are constants, respectively;
$c_5$ to $c_7$ are spatial constants of coupling between cells weighted as the associative memory; and
$N1^k$ is indicative of the status of the excitation of the control neuron which regionally restrains the excitation of the neuro-network at a time k.

Figure 10:
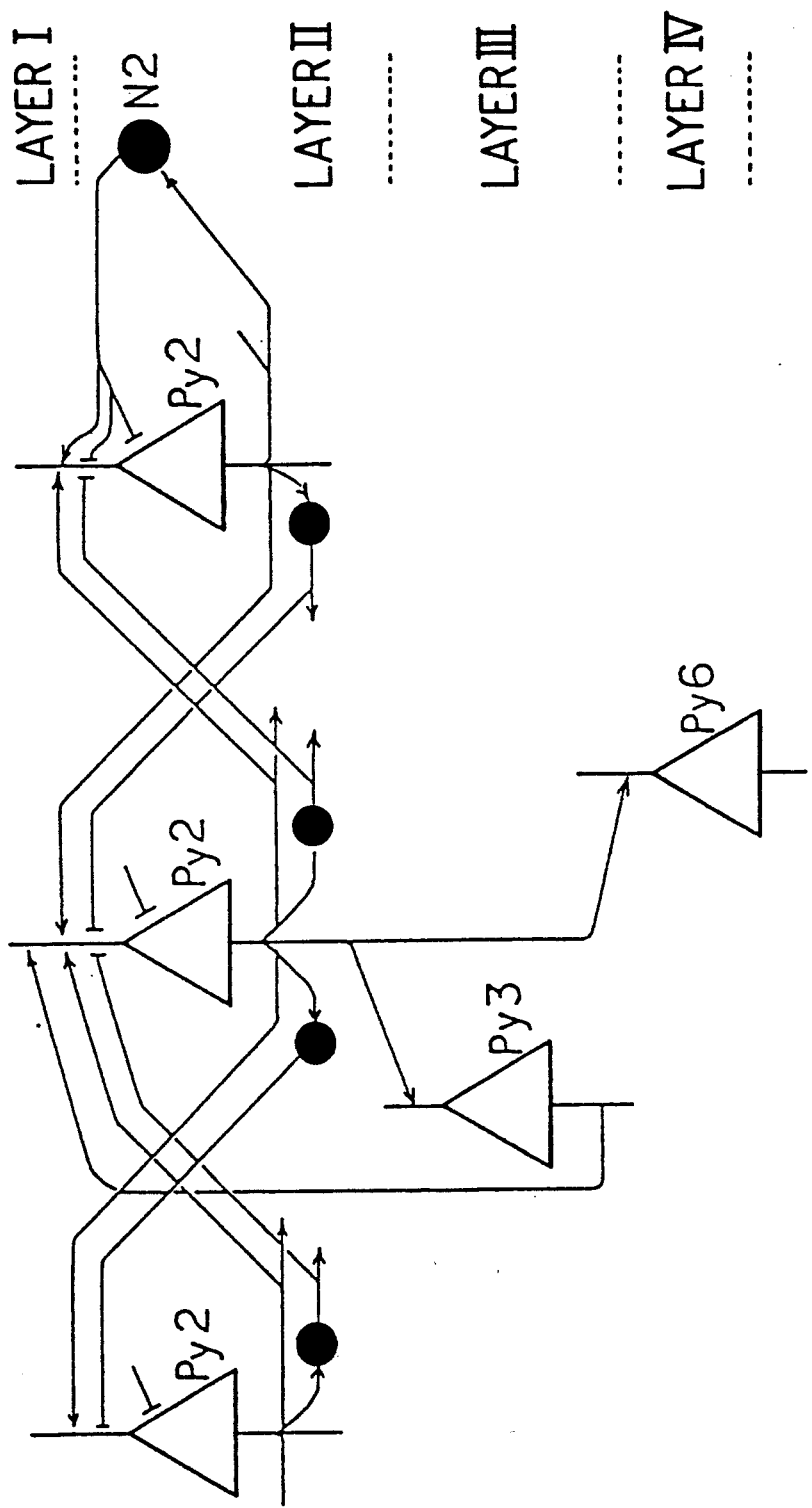
FIG. 10 is a detailed connection diagram of the circuit composed of pyramidal cells included in the second layer of the striate cortex shown in FIG. 2.

Further referring to FIG. 10, there is illustrated an coupling diagram of a neuro-network composed of pyramidal cells Py2 which can be seen in the layer II shown in FIG. 2. The Py2 cells are considered to form an associative memory, whose operates at a relatively slow speed. The operation of this associative memory can be expressed by the following equation.

$$Py2_{ijzx}^k = F\Bigg[b10 \cdot Py2_{ijzx}^{k-1} + \sum_{u,v,w} C20_{uvwijzx} \cdot Py3_{uvw}^{k-1} +$$
$$\sum_{u,v,w,y} C21_{uvwyijzx} \cdot Py2^{k-1} - \sum_{u,v,w,y} C22 \cdot Py2_{uvwy}^{k-2} - N2^{k-1}\Bigg]$$

$$N2^k = \sum_{ijzx} a30 \cdot Py2_{ijzx}^{k-1}$$

where $a_{30}$ and $b_{10}$ are constants, respectively;
$c_{20}$ to $c_{22}$ are weighted spatial constants of coupling between cells for forming the associative memory; and
$N2^k$ is indicative of the status of the excitation of the control neuron which regionally restrains the excitation of the neuro-network at a time k.

As seen form FIGS. 8 to 10, the pyramidal cells found in large numbers in the layers II, III and VI are mutually coupled in the same layer. At present, the signal processing between these layers has been studied in more detail and considered to function as an associative memory having a connection pattern diagrammatically shown in FIG. 11.

Figure 11:
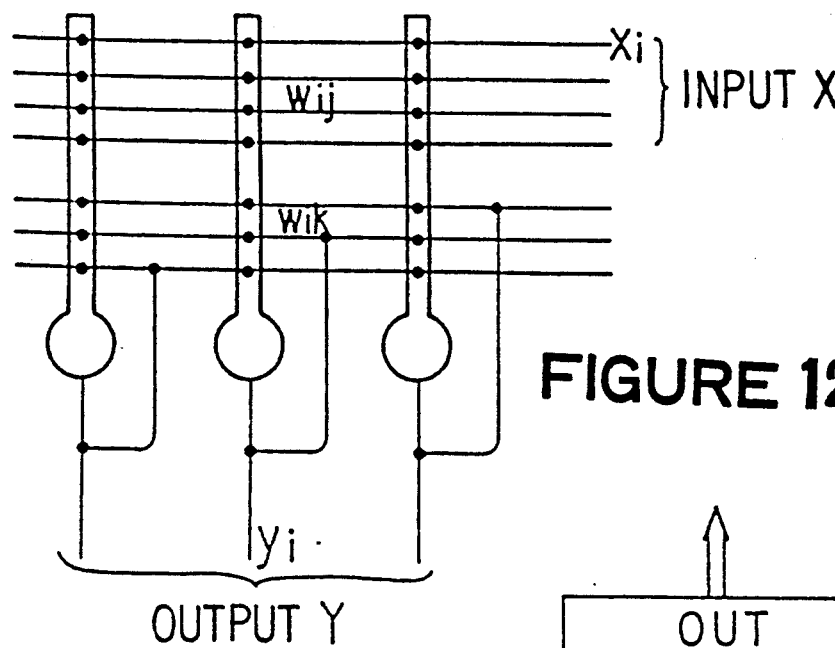
FIGS. 11 and 12 illustrate a mutual connection of pyramidal cells in the same layer.

The model of associative memory shown in FIG. 11 operates as expressed by the following equation:

$$Y_i = f\left(\sum_{j=1}^n W_{ij}X_{ij} + \sum_{k=1}^m W_{ik}Y_k - \tau_i\right)$$

$$W_{ij} = g(X_i, Y_j, W_{ij})$$

$$W_{ik} = h(X_i, Y_k, W_{ik})$$

where
Xi is an input;
Yi is an output;
Wij is the influence intensity of a (j)th input to a synapse cell (i) or an input from a (j)th synapse cell;
Wij assumes positive and negative which mean excitation and restraint;
Ti is a threshold; and
f() is a Sigmoid type function.

As regards the study of weighting in the functions (g() and h()), various mechanisms have been proposed. For example, referring to a coupling diagram of nerve cells in the brain proposed by Hebb, the weighting varies dependently upon correlation of the activity of the factors X and Y.

In the model mentioned above, the external input Xi is cyclicly weighted in the network to generate a new pattern.

Figure 12A:
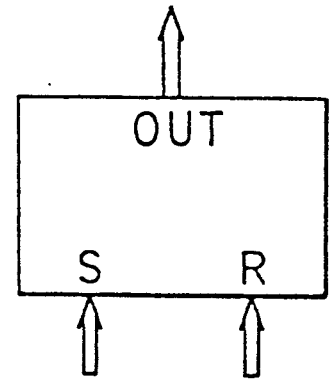
FIG. 12A illustrates a block indicative of an associative memory composed of the pyramidal cells and the others.
Figure 12:
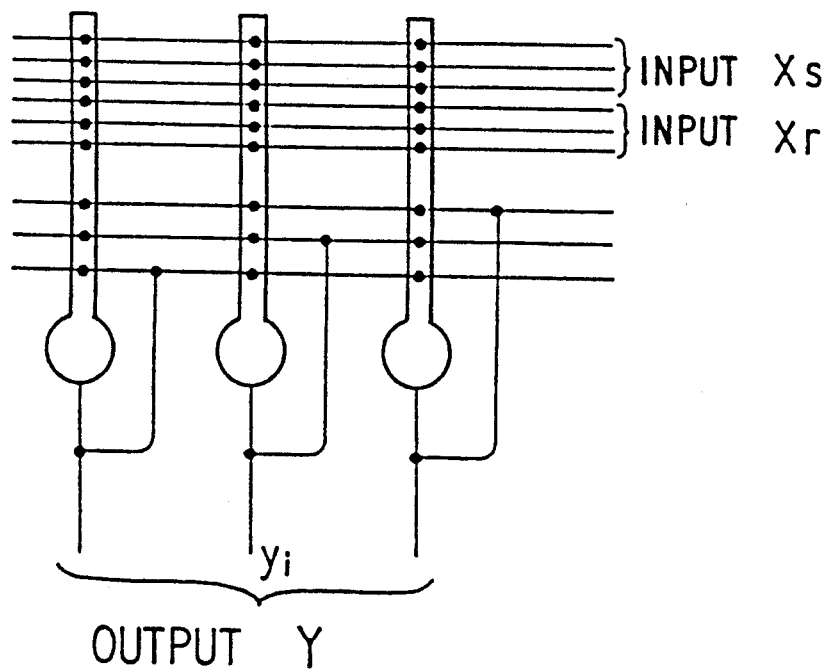

In addition, if the input Xi is regarded as being composed of two groups of inputs Xs and Xr as illustrated in FIG. 12, it is possible to call, on the basis of a reference input, an associative memory for an input to be referred to. Such an associative memory can be depicted in shown in FIG. 12A.

As mentioned above, if the striated cortex is composed of stacked layers of associative memories, the lower the associative memory layer becomes, the more the interaction between the associative memories is localized. Therefore, the signal processing in the striate cortex can be expected to have a layered structure. In addition, interaction between columns can be found in the layers II and III of the striate cortex. Thus, if one column as mentioned above is illustrated in the form of a block diagram while considering connection between the layers, it can be shown as FIG. 13.

(E) "Take-Grant-Control" Mechanism

Now, consideration will be made to an operation of the overall system starting from the thalamus to the striate cortex, with reference to FIG. 13.

(i) If a perceptual input is applied to a thalamus/reticular complex IF1, a pattern of firing corresponding to signals having the largest intensity among the signals firstly inputted to the thalamus/reticular complex is formed in the Th cells of the thalamus/reticular complex IF1. In this process, the associative memory of the VI layer RO of striate cortex is called so that the input signal pattern is suppressed to an appropriate number of input channels.

(ii) This suppressed input signal pattern is immediately inputted through the IV layer IF2 to the III layer R1 so as to call the associative memory R1 of the III layer. As a result, a representation of the suppressed input signal selected in the course of the step (i) is rearranged, and the associative memory R1 generates a feedback signal so that the pattern inputted to the associative memory R1 becomes consistent with a representation which is stored in the associative memory R1 and which should be inherently possessed by the input pattern.

(iii) As the result of the process of the step (ii), a consistent pattern of firing will be generated in the thalamus/reticular complex IF1, the VI layer R0 and the III layer R1. Thereafter, the Th cells in the thalamus/reticular complex IF1, which had firstly fired, are brought into an insensitive period. This insensitiveness of the Th cells is caused either due to the elapse of the time $T_B$ or because of the feedback from a high level layer. Further, the Th cells in the thalamus/reticular complex IF1 are succeedingly fired in the order of the intensity of the signals so that the steps (i), (ii) and (iii) are repeated for each pattern of firing.

(iv) As mentioned above, the associative memory R2 of the II layer has a relatively long time constant.

Therefore, the associative memory calls a regional feedback pattern in accordance with the firing pattern of the associative memory R1, and outputs the regional feedback pattern to the associative memories R1 and R0.

At this time, if a time sequence of firing pattern already obtained is stored for a short time, a plurality of related firing patterns are suppressed to one pattern, and in addition, it becomes possible to represent a pattern of weak signals as shown in FIG. 6B.

As mentioned above, the lower place layers are controlled in accordance with the content held in the higher place layers in a feed-forward manner. This is called a "take-grant-control".

Figure 14:
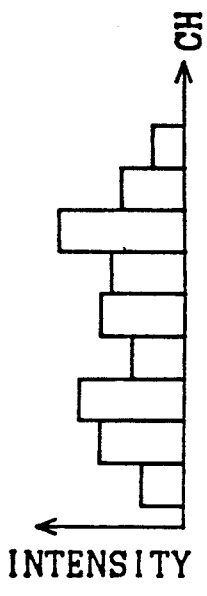
FIG. 14(A) to 14(M) diagrammatically illustrate the mechanism of the response operation for controlling the lower place layers in a feedforward manner by utilizing the content memorized in the high place layers.
Figure 14:
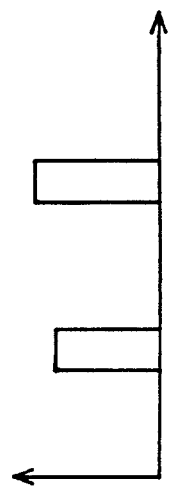
Figure 14:
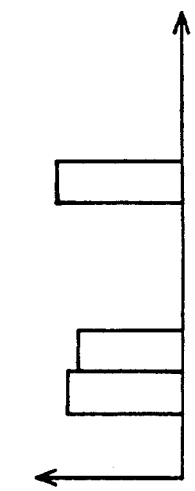
Figure 14:
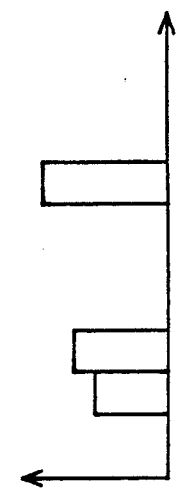
Figure 14:
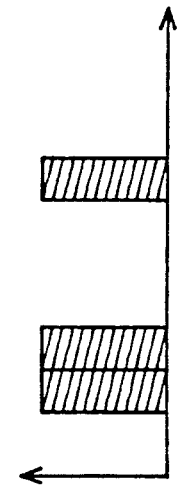
Figure 14:
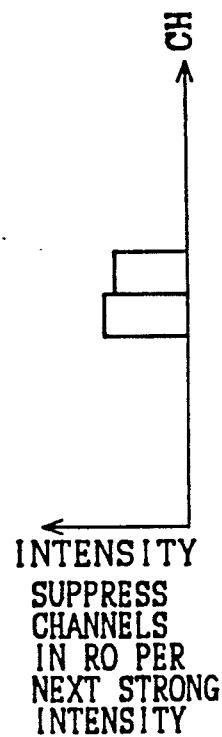
Figure 14:
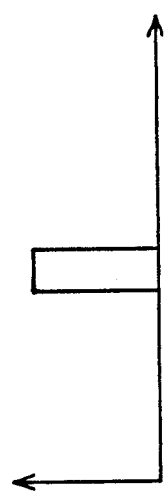
Figure 14:
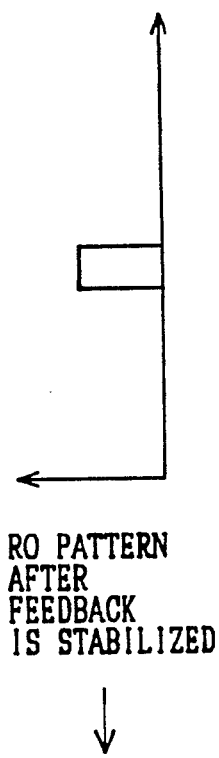
Figure 14:
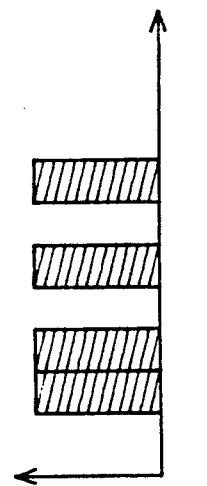
Figure 14:
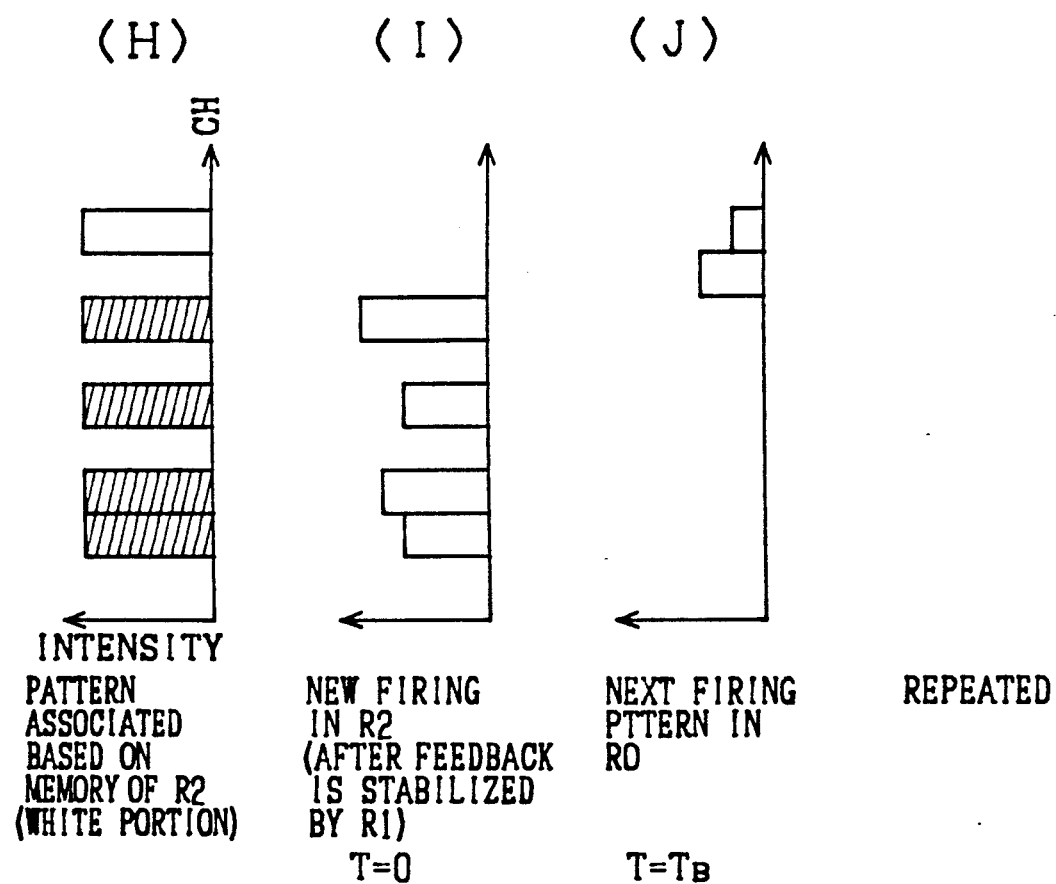

Referring to FIG. 14, the above mentioned operation is illustrated. First, in response to given input signals, a channel pattern corresponding to the intensities of the signals is formed as shown in FIG. 14(A). The associative memory R0 suppresses the channel number of the generated channel pattern so that the channel pattern is converted into a suppressed channel pattern as shown in FIG. 14(B) so as to allow to extract a pattern of the largest intensity signals. On the other hand, the related pattern as shown in FIG. 14(C) is recalled in the associative memory R1 and then is fed back to the associative memory R0. Thus, the pattern of firing in the associative memory R0 will be stabilized in accordance with the degree of consistency between the pattern of the R0 itself and the feedback pattern, as shown in FIG. 14(D). A pattern corresponding to the stabilized pattern is memorized in the associative memory R2, as shown in FIG. 14(L).

If the pattern shown in FIG. 14(D) is brought into an inactive or insensitive period, the associative memory R0 responds to the channel pattern shown in FIG. 14(A) so as to produce a suppressed channel pattern corresponding to input signals having a second intensity, as shown in FIG. 14(E). On the other hand, the related pattern recalled in the associative memory R1 as shown in FIG. 14(F) is fed back to the associative memory R0. Thus, the pattern of firing in the associative memory R0 will be stabilized in accordance with the degree of consistency between the pattern of the R0 itself and the feedback pattern, as shown in FIG. 14(G). A pattern corresponding to the stabilized pattern is memorized in the associative memory R2, as shown in FIG. 14(M).

As a result, a pattern as shown in FIG. 14(H) is recalled in the associative memory R2 in accordance with its content stored in the memory itself, and the pattern of firing in the associative memory R2 will be stabilized in accordance with the degree of consistency between the recalled pattern of the R2 itself and the feedback pattern from the memory R1, as shown in FIG. 14(I). Thereafter, during the inactive period of the first firing pattern, the memory R0 will fire in a next pattern of firing as shown in FIG. 14(J).

Figure 15:
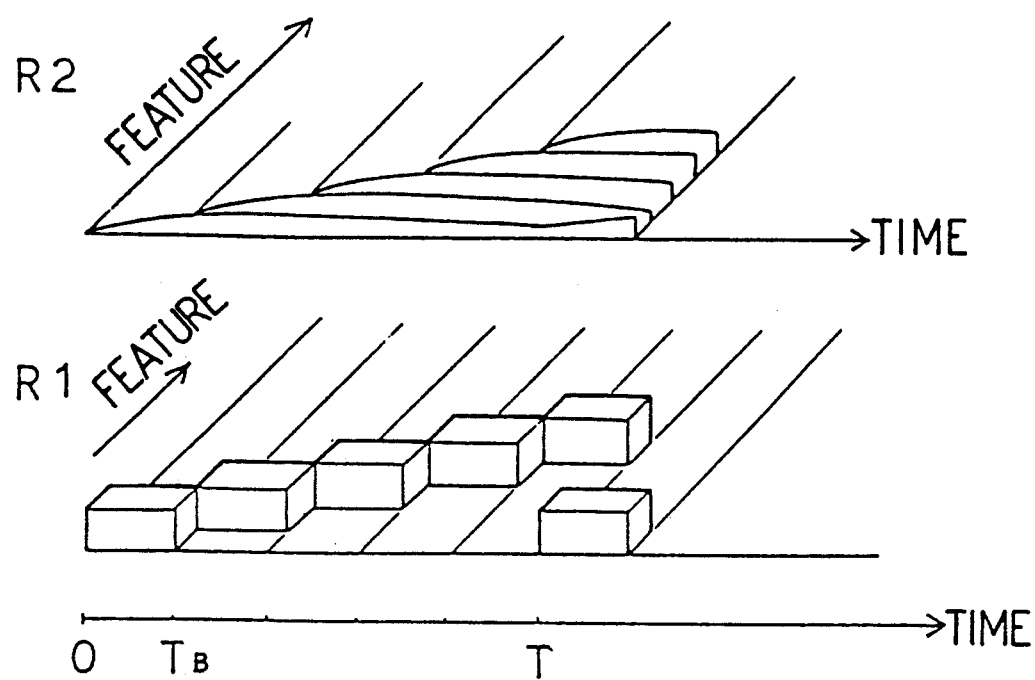
FIG. 15 is a conceptional diagram illustrating the firing pattern of the associative memories R1 and R2 shown in FIG. 13.

FIG. 15 illustrates the conception of the firing pattern in the memories R1 and R2. In the memory R1, the firing will terminate after the time of $T_B$ has elapsed, but the firings are superimposed in the memory R2 since the memory R2 has the long time constant as mentioned above.

Figure 16:
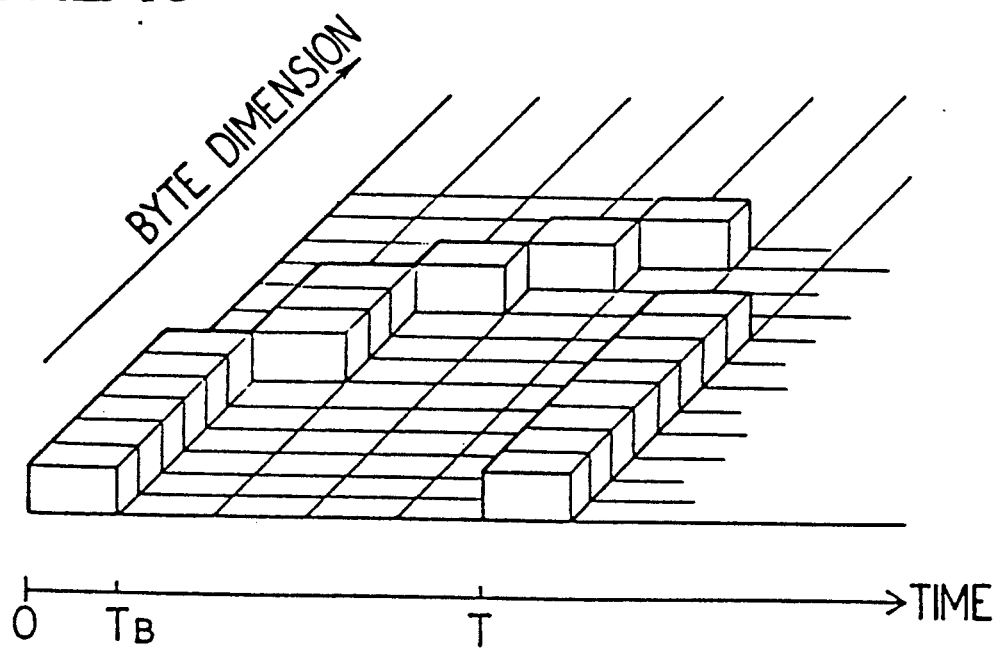
FIG. 16 is a conceptional diagram illustrating the firing condition of the associative memory R1 shown in FIG. 13.

FIG. 16 illustrates the conception of the firing pattern in the memory R1 in which the number of blocks indicates the degree of firing. As seen from FIG. 16, the first firing has the maximum degree of firing.

It would be understood from these figures how the pattern of firing changes with time, and therefore, how the input signals are interpreted or recognized.

Figure 17:
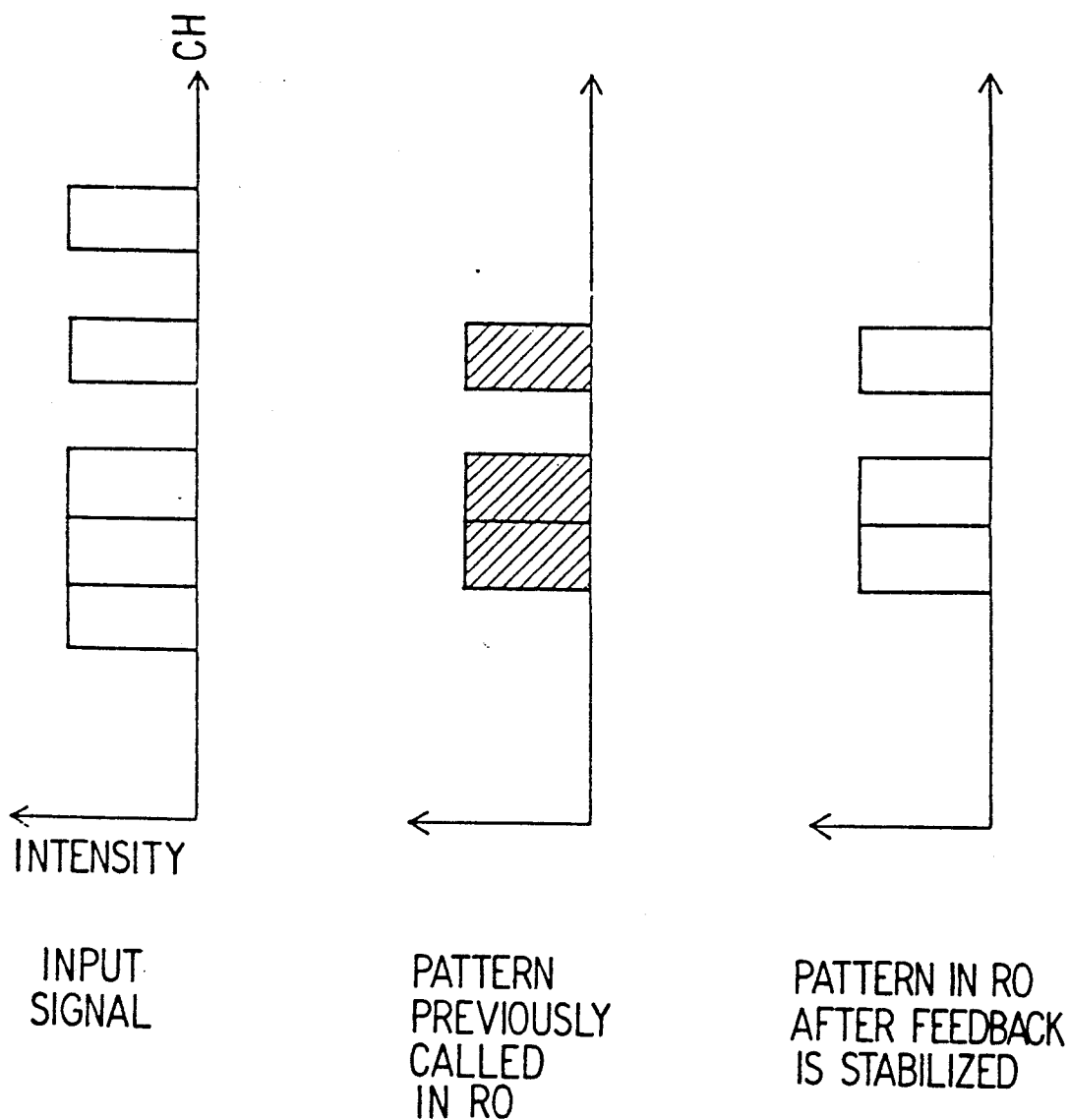
FIG. 17 diagrammatically illustrate the mechanism of the response operation different from the example shown in FIG. 14.

In addition, turning to FIG. 17, there is illustrated that if a pattern is previously recalled from a higher place layer or memory such as the memory R2, it is possible to extract one pattern from even an input pattern which does not have a substantial difference of intensity.

The above mentioned description has been directed to the signal processing executed in the single column. However, if one column has an interaction with another column, it is possible to process the perceptual signals respectively inputted to the two columns, while taking into consideration the correlation between the perceptual signals respectively inputted to the two columns.

(F). Basic Construction of the Pattern Recognition System

Figure 18:
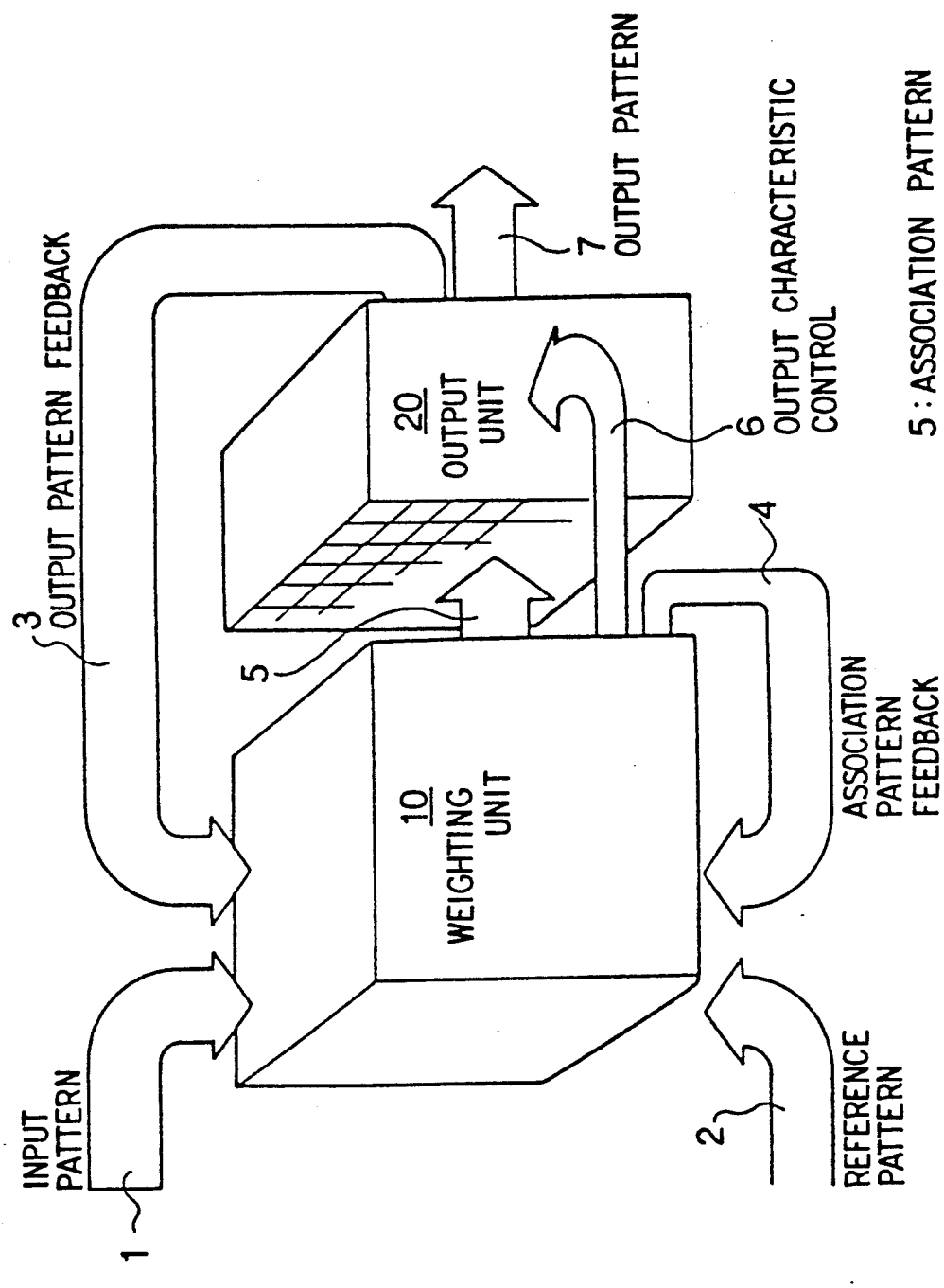
FIG. 18 is a conceptional block diagram of a basic signal processing unit used for constructing the pattern recognition system in accordance with the present invention.

Taking into consideration the signal processing mechanism in the cerebrum, the pattern recognition system in accordance with the present invention is composed of a basic signal processing unit shown in FIG. 18.

The shown signal processing unit comprises a weighting unit 10 and an output unit 20. The weighting unit 10 receives a group of input pattern signals 1 and a group of reference pattern signals 2 and also receives a group of output pattern feedback signals 3 fed back from the output unit 20 and a group of associated pattern feedback signals 4 generated by the weighting unit 10 itself. Thus, the weighting unit 10 operates to properly weight the received signals (by application of negative and positive signs) and then outputs a group of associated pattern signals 5 and a group of output characteristic control signals 6 to the output unit 20. In addition, the weighting unit 10 generates the above mentioned group of associated pattern feedback signals 4. On the other hand, the output unit 20 process the received group of associated pattern signals 5 with the time response characteristics of the output unit itself modified in accordance with the group of output characteristic control signals 6, and generates a group of output pattern signals 7 and the above mentioned group of output pattern feedback signals 3.

Thus, a signal processing substantially equal to that executed in the cerebrum can be realized by using a plurality of signal processing units as mentioned above.

Here, assume that the signal intensity of (i)th signal of the input pattern signal group 1 at the time "k" is represented by $I_{1i}{}^k$, and the signal intensity of (i)th signal of the reference pattern signal group 2 at the time "k" is represented by $I_{2i}{}^k$. Also assume that the signal intensity of (i)th signal of the output pattern feedback signal group 3 at the time "k" is represented by $I_{3i}{}^k$, and the signal intensity of (i)th signal of the associated pattern feedback signal group 4 at the time "k" is represented by $I_{4i}{}^k$. Further, assume that the signal intensity of (i)th signal of the associated pattern signal group 5 at the time "k" is represented by $I_{5i}{}^k$, and the signal intensity of (i)th signal of the output characteristic control signal group 6 at the time "k" is represented by $I_{6i}{}^k$. In addition, assume that the signal intensity of (i)th signal of the output pattern signal group 7 at the time "k" is represented by $I_{7i}{}^k$. Thus, the processing units are constructed to fulfill the following relation for the respective signals.

$$I_{pi}^k = F\left(\sum_{r=1}^{6} \sum_l W_{ilrp} I_{rl}^{k-1} - \tau_{pi}\right)$$

where $p = 4, 5, 6$ $$I_{qi}^k = B(I_{5i}^k, I_{6i}^k)$$

where $p = 3, 7$

Where $F(\alpha)$ is an appropriate non-linear function such as $$F(\alpha) = \alpha \text{ if } 0 \leq \alpha \leq ct_1$$
$$0 \text{ if } \alpha < 0$$
$$ct_1 \text{ if } \alpha > ct_1 \text{ and}$$

$B(\alpha,\beta)$ is a function conducting a monostable operation in response to the value of $\alpha$ in such a manner that the time constant or the elapse of time is changed by the value of $\beta$. For example, $$B(\alpha, \beta) = \alpha \text{ if } \alpha < ct_2$$
$$P \text{ if } \alpha \geq ct_2 \text{ at } t = k \text{ and}$$
$$t < k + \beta(T_B + T_R + T_{R'})$$
$$0 \text{ if } \alpha < ct_6$$

where $$P = ct_3 \text{ for } k \leq t < k + \beta T_B$$
$$P = ct_4 \text{ for } k + \beta T_B \leq t < k + \beta(T_B + T_R)$$
$$P = ct_5 \text{ for } k + \beta(T_B + T_R) \leq t < k + \beta(T_B + T_R + T_{R'})$$

Figure 19:
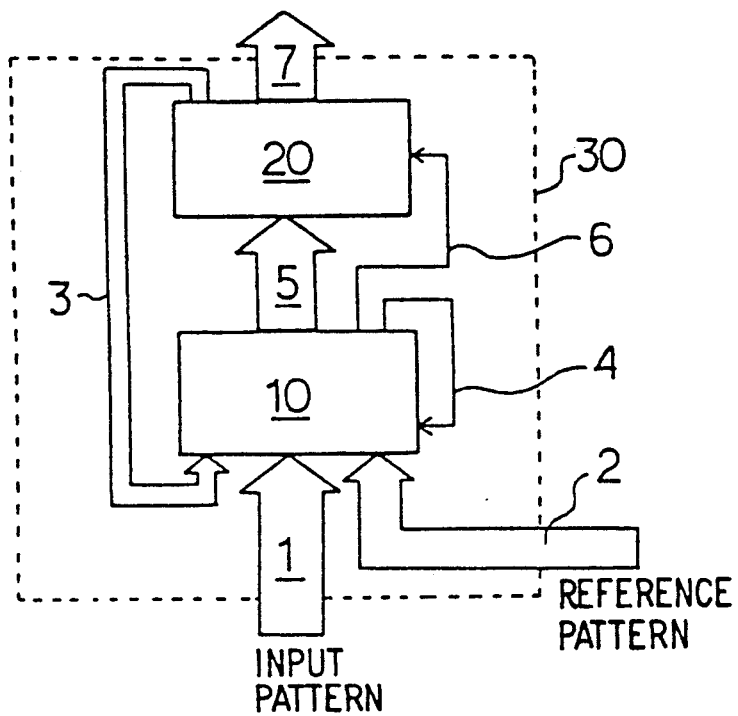
FIGS. 19 and 20 illustrate two typical connection manners for inputs and outputs of the signal processing unit shown in FIG. 18, respectively.
Figure 20:
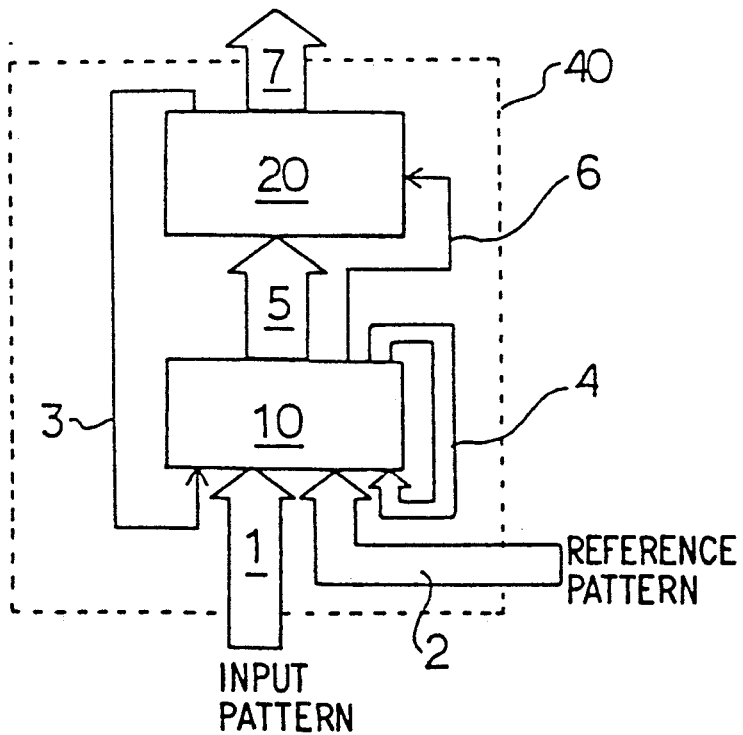

(1) In the signal processing unit having the above mentioned characteristics, an external pattern signal group is inputted as the input pattern signal group 1 and a predetermined reference is given as the reference pattern input signal group 2, as shown in FIG. 19. In addition, there is set to generate a predetermined constant value or pattern of associated pattern feedback signal group 4 and output characteristic control signal group 6, respectively. Further, the weighting unit 10 is set to have such weighting coefficients that the signals of the output pattern feedback signal group 3 are suppressedly added to the respective signals of the input pattern signal group 1 positioned spatially near to the the signals of of the output pattern feedback signal group 3. On the other hand, the output unit 20 is set to assume a predetermined monostable operation.

With this arrangement, a signal processing unit capable of executing the above mentioned "Parallel-in-Sequence" operation can be constructed of only one unitary signal processing unit.

(2) In the above mentioned "Parallel-in-Sequence" signal processing unit, it is possible to control, in accordance with a given reference pattern, the order of priority and the range for extracting the features of the given input pattern. Accordingly, the construction of the extracted features in the time sequence can be easily modified by changing the reference pattern given from the external. With this modification, a signal processing unit capable of executing the above mentioned "Variable-byte Formation" operation can be constructed of only one unitary signal processing unit.

(3) In the signal processing unit having the above mentioned characteristics, an external pattern signal group is inputted as the input pattern signal group 1 and a predetermined reference pattern is given as the reference pattern input signal group 2, as shown in Figured 20. Further, the weighting unit 10 is set to generate the associated pattern feedback signal group 4 weighted in a predetermined pattern. In addition, the units are made to a predetermined constant value or pattern of output pattern feedback signal group 3 and output characteristic control signal group 6, respectively. Furthermore, the weighting unit 10 is set to have such weighting coefficients that it outputs the associated pattern signal group 5 which is generated in response to the input pattern signal group 1 and in accordance with the respective signals of the reference pattern signal group 2 and the weighted pattern feedback signal group 4. On the other hand, the output unit 20 is set to perform a simple proportional operation such as $B(\alpha,\beta)=\alpha\cdot\beta$ (where this is effective for all of $\alpha$ and $\beta$).

With the above arrangement, an associative signal processing unit can be constructed of a single processing unit.

(4) In the signal processing unit mentioned just above, the output unit 20 can be modified to perform a predetermined monostable operation having a long time constant. In this case, a signal processing unit which can execute not only a simple associative operation but also a short term memory operation can be constituted of a single signal processing unit.

Figure 21:
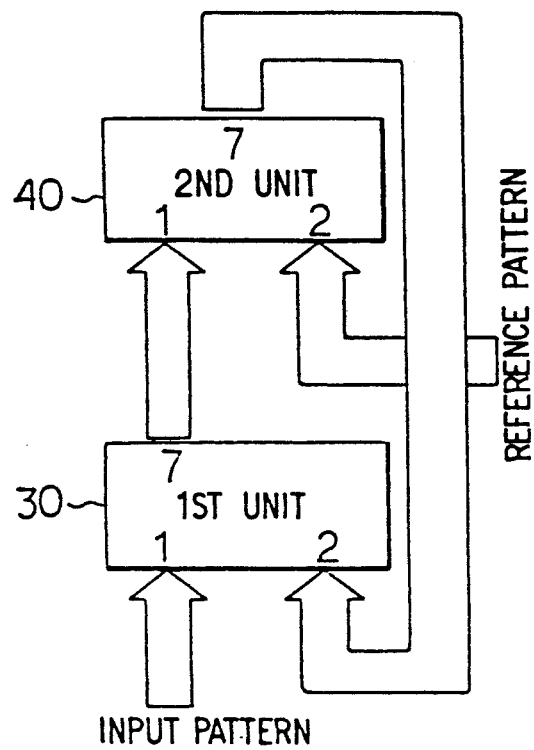
FIGS. 21, 22 and 23 are block diagrams of examples of the pattern recognition systems constituted by coupling the signal processing units shown in FIGS. 19 and 20 in different manners, respectively.

(5) A first unit 30 having the construction mentioned in the above item (2) and a second unit 40 having the construction mentioned in the above item (3) are coupled as shown in FIG. 21. Specifically, an external pattern signal group is inputted as the pattern input signal group 1 for the first unit 30 and the output pattern signal group 7 of the first unit 30 is inputted as the pattern input signal group 1 for the second unit 40. In addition, the output pattern signal group 7 of the second unit 40 is inputted as the reference pattern input signal group 2 for the first unit 30, and a predetermined external reference pattern signal is applied as the reference pattern input signal group 2 for the second unit 40. Further, the time constant of the output unit of the first unit 30 is set so that the monostable operation of the first unit 30 is sufficiently later than the associative operation of the second unit 40.

With the above arrangement, some features included in the inputted external pattern signal group can be put, in accordance with the external reference pattern, in the order which matches combinations of features previously memorized in the second unit 40. Thus, the feature groups developed in the time sequence can be obtained.

Figure 22:
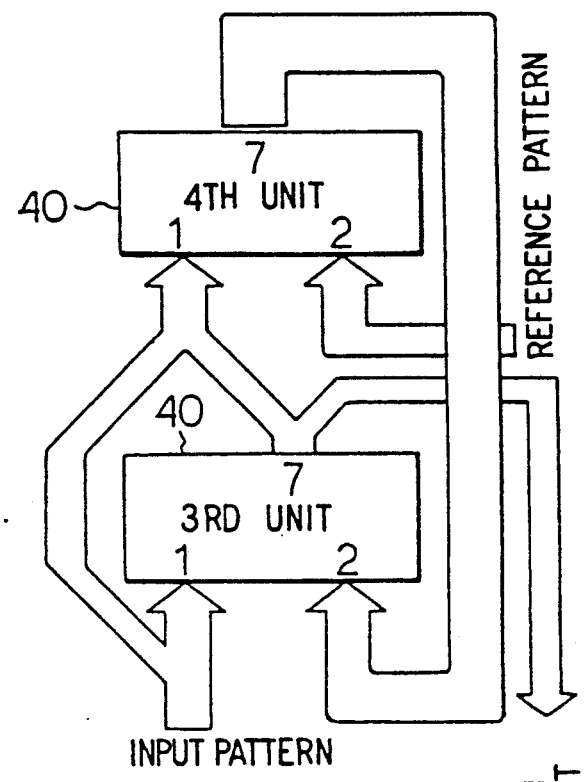

(6) Third and fourth units 40 having the construction mentioned in the above item (3) are coupled as shown in FIG. 22, so that a local feature included in an external input pattern signal group is associated in the third unit and a regional feature which unifies local features is associated in the fourth unit. Specifically, an external pattern signal group is inputted as the pattern input signal group 1 for each of the third and fourth units 40, and the output pattern signal group 7 of the fourth unit 40 is inputted as the reference pattern input signal group 2 for the third unit 40. In addition, a predetermined external reference pattern signal is applied as as the reference pattern input signal group 2 for the fourth unit 40, and the output pattern signal group 7 of the third unit 40 is inputted as the pattern input signal group 1 for the fourth unit 40 and outputted as an association output. Furthermore, the weighting units 10 of the third and fourth units 40 are weighted so that the output pattern signal group 7 of the third unit will give the association output.

With the above arrangement, the system can associate spatially layered features.

Figure 23:
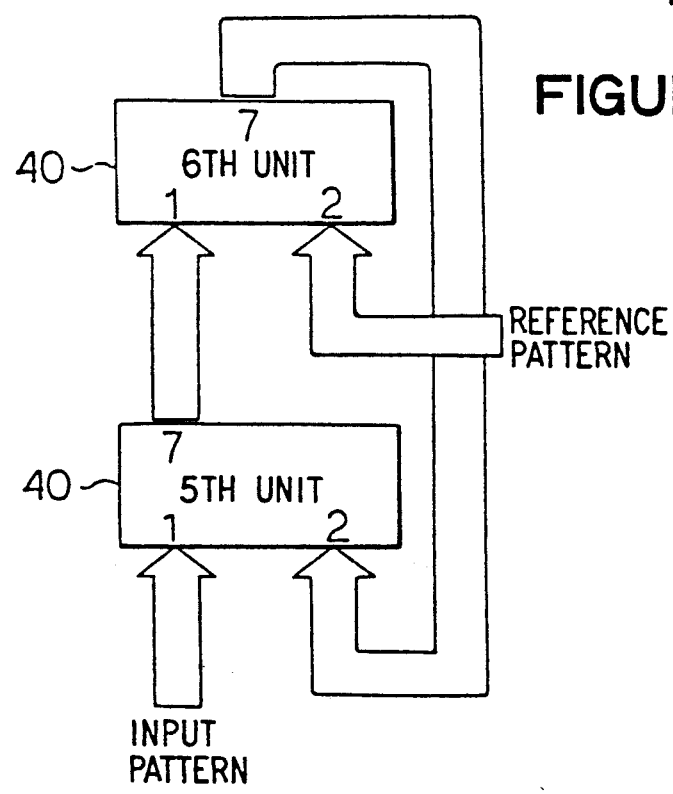

(7) Fifth and sixth units 40 having the construction mentioned in the above item (3) are coupled as shown in FIG. 23. Specifically, an external pattern signal group is inputted as the pattern input signal group 1 for the fifth unit 40 and the output pattern signal group 7 of the fifth unit 40 is inputted as the pattern input signal group 1 for the sixth unit 40. In addition, the output pattern signal group 7 of the sixth unit 40 is inputted as the reference pattern input signal group 2 for the fifth unit 40, and a predetermined external reference pattern signal is applied as the reference pattern input signal group 2 for the sixth unit 40. Further, the weighting units 10 of the fifth and sixth units 40 are weighted in a predetermined manner.

With the above arrangement, the system can momently associate the external pattern signal group which varies in the time sequence.

(8) If the sixth unit in the just above mentioned system is replaced with the unit having the construction mentioned in the Item (4), the system can associate, in a layered structure, the external pattern signal group which varies in the time sequence.

Figure 13:
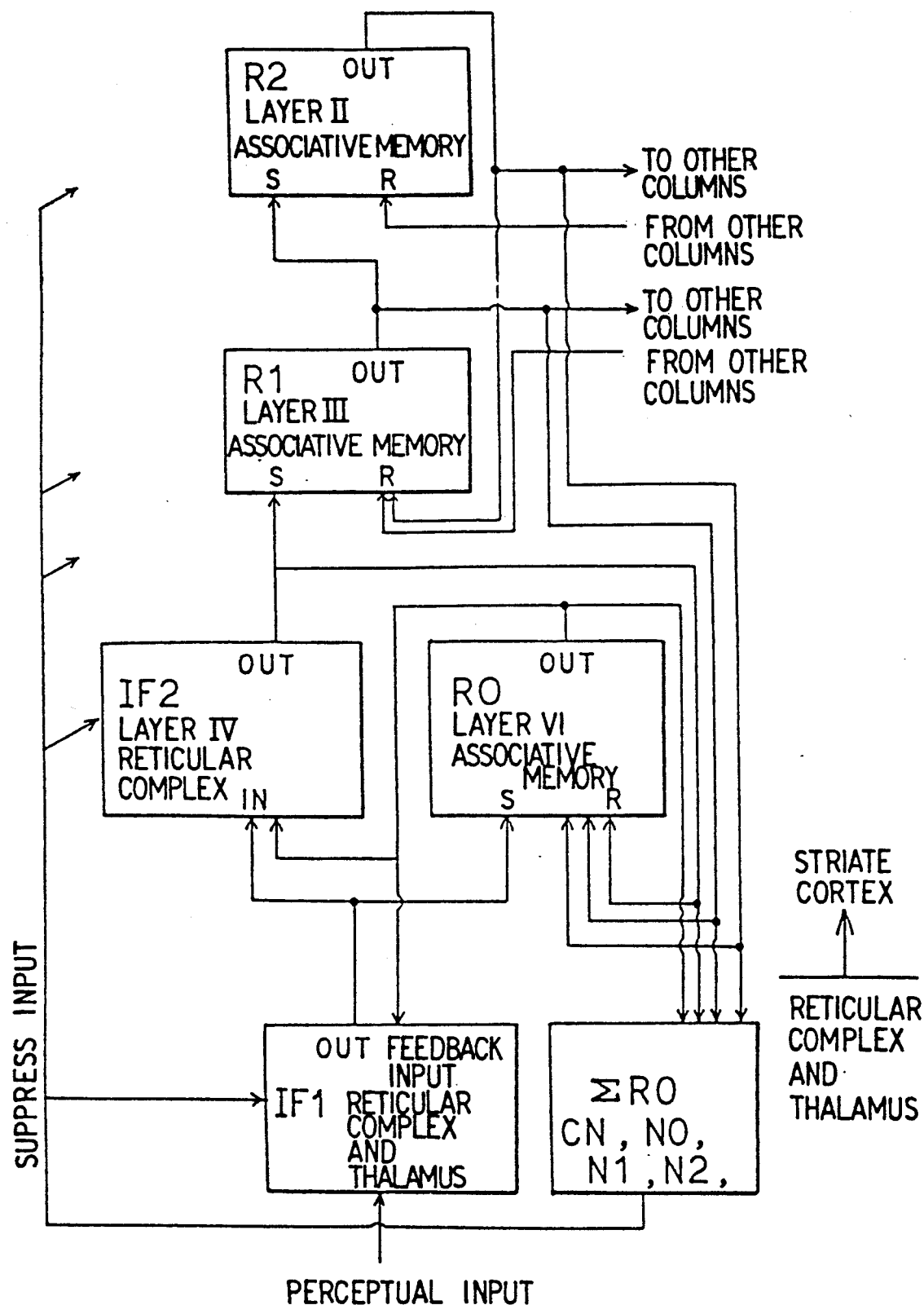
FIG. 13 is a diagram illustrating one column of the cerebrum striate cortex in the form of function blocks.

(9) Thus, an appropriate combination of the units mentioned in the above items (1) to (4) by using the unit couplings mentioned in the above items (5) to (7), can provide a system which can realize the signal processing as shown in FIG. 13.

Figure 24:
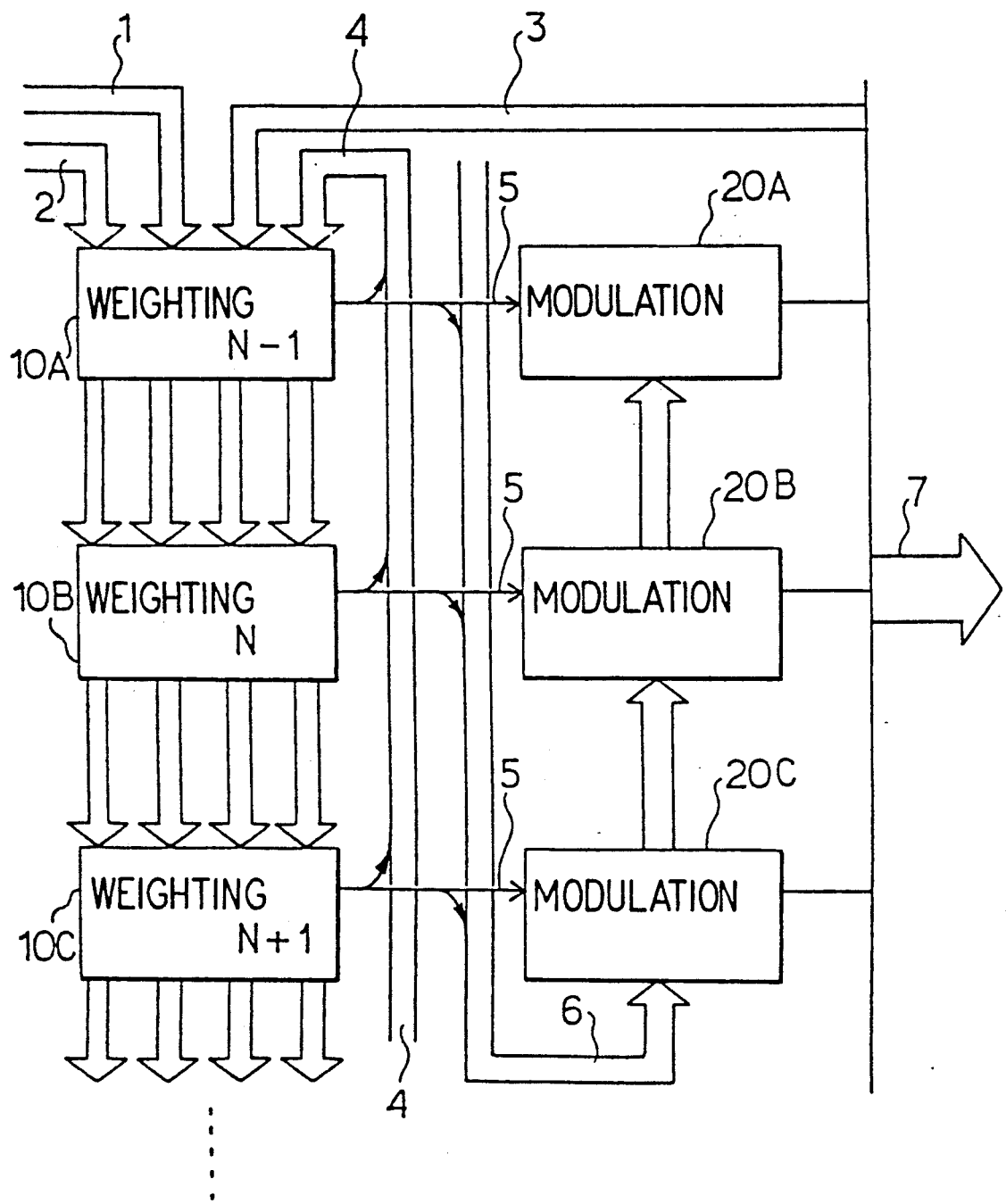
FIG. 24 is a detailed block diagram of the signal processing unit shown in FIG. 18.

Referring to FIG. 24, there is shown one example of an apparatus which can realize the signal processing unit shown in FIG. 18.

The weighting unit 10 shown in FIG. 18 can be composed of a plurality of weighting cells 10A, 10B, 10C, . . . having the same structure and coupled in a layered construction. Each of the respective weighting cells 10A, 10B, 10C, . . . is coupled to receive, in parallel, the input pattern signal group 1, the reference pattern signal group 2, the output pattern feedback signal group 3 and the associated pattern signal group 4.

Each of the weighting cells 10A, 10B, 10C, . . . has an output connected to an input of a corresponding one of modulation cells 20A, 20B, 20C, . . . which have the same construction as one another. The outputs of all the weighting cells 10A, 10B, 10C, . . . are all or selectively collected together to form the associated pattern feedback signal 4 and the output characteristics control signal group 6.

On the other hand, the modulation cells 20A, 20B, 20C, . . . operate to modulate the outputs of the corresponding weighting cells 10A, 10B, 10C, . . . in accordance with the output characteristics control signal group 6. Modulated signals respectively outputted from all the modulation cells 20A, 20B, 20C, . . . are collected together to form the output pattern signal group 7. From the output pattern signal group 7, signals are selectively extracted as desired to form the output pattern feedback signal group 3.

Figure 25:
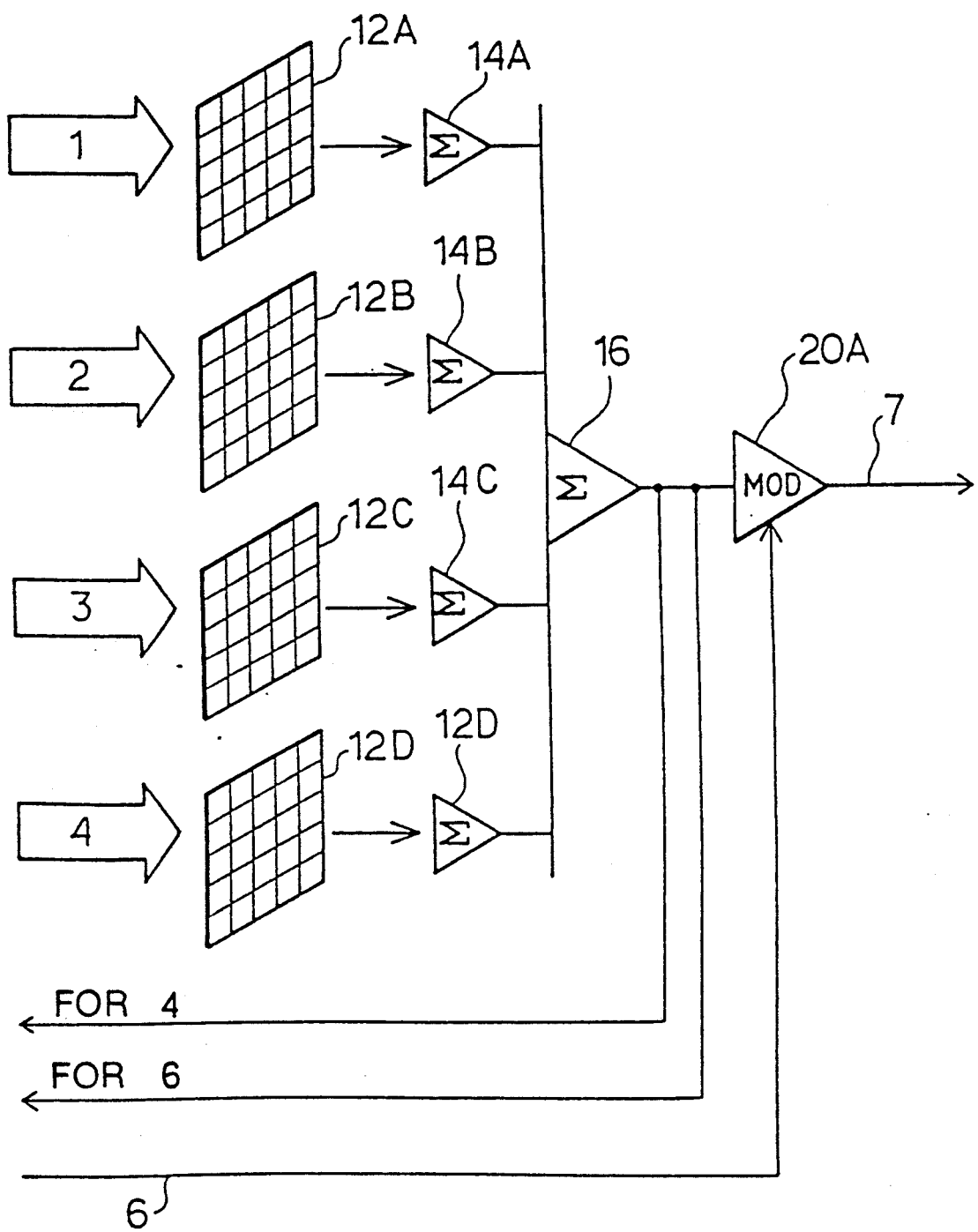
FIG. 25 is a detailed block diagram of the weighting unit used in the signal processing unit shown in FIG. 24.

More specifically, the weighting cell 10A can be formed for example as shown in FIG. 25. Namely, the weighting cell includes four weight data tables 12A, 12B, 12C and 12D which respectively receive the input pattern signal group 1, the reference pattern signal group 2, the output pattern feedback signal group 3 and the associated pattern signal group 4, independently of one another. Each of the weight data tables 12A, 12B, 12C and 12D operates to weight the respective signals of the received signal group in accordance with the values allocated at corresponding positions of the table, respectively. The signal thus weighted by the table are outputted to a corresponding one of four adders 14A, 14B, 14C and 14D. Further, outputs of all the adders 14A, 14B, 14C and 14D are inputted to another adder 16 whose output constitutes the output of the weighting cell. In other words, the output of the adder 16 is connected to the input of the modulation cell 20A whose degree of modulation is controlled by the output characteristics control signal group 6. In addition, as mentioned above, the output of the adder 16 is outputted to form a part of each of the associated pattern feedback signal group 4 and the output characteristics control signal group 6.

Figure 26:
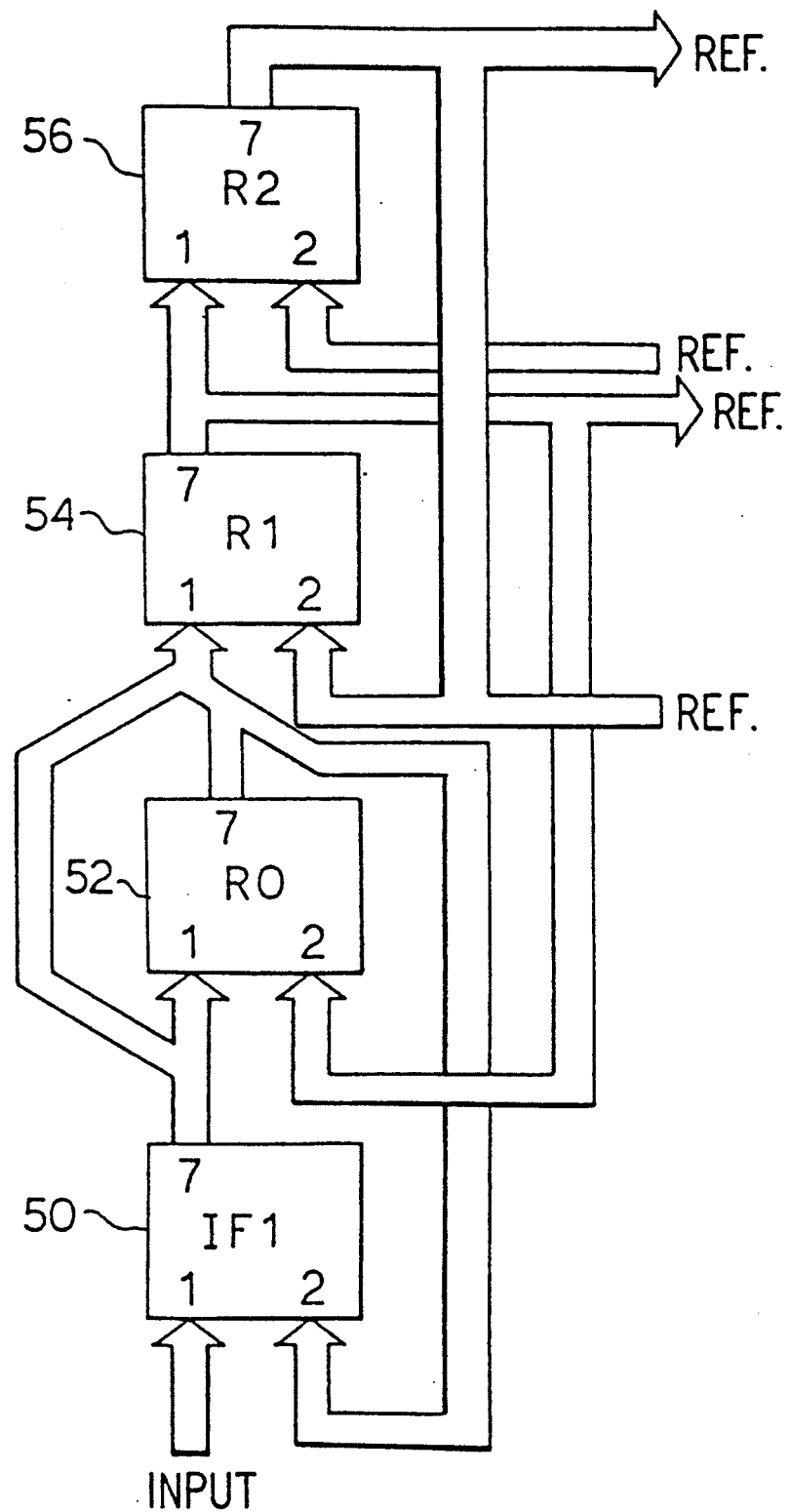
FIG. 26 is a block diagram of one embodiment of the pattern recognition system in accordance with the present invention which can associate the features of an object to be recognized, in the order arranged in accordance with the time sequence and the layered structure.

Thus, an association system which has the functions of the system shown in FIG. 13 and which can associate features involved in an order arranged in accordance with a layered structure and a time sequence, can be constituted by using the above mentioned signal processing units coupled as shown in FIGS. 21, 22, 23 and 24, respectively and by combining those units as shown in FIG. 26. The system shown in FIG. 26 includes four units 50, 52, 54 and 56. As seen from comparison between FIG. 26 and FIGS. 21, 22 and 23, the units 50 and 52 form the system shown in FIG. 21, and the units 52 and 54 form the system shown in FIG. 22. The units 54 and 56 form the system shown in FIG. 23.

In the embodiment of the pattern recognition system mentioned above, if a pattern to be recognized is a graphic pattern, the input pattern signal group can be obtained by picking up an image of the graphic pattern by use of an imaging means such as a television camera, then converting an obtained video signal into a digital video signal and also converting the digital signal into a suitable mesh of matrix. If the pattern to be recognized is a sound, an input pattern signal can be obtained by analyzing the sound into a frequency spectrum, digitizing respective frequency components and allocating the digitized frequency components into a suitable mesh of matrix. Therefore, the reference pattern can be prepared in a similar manner.

As seen from the above description, the pattern recognition system of the present invention can recognize a given pattern in various manners by combining unitary association memory units having the same structure.

The invention has thus been shown and described with reference to the specific embodiments. However, it should be noted that the invention is in no way limited to the details of the illustrated structures but changes and modifications may be made within the scope of the appended claims.

We claim:

1. A pattern recognition system comprising at least first, second, third, and fourth basic associative units, each unit having at least first and second unit ports for receiving pattern signal groups and a third unit port for outputting a pattern signal group, each of the basic units operating to derive weighting values for respective signals of the pattern signal groups inputted to the first and second unit ports of the basic unit itself in accordance with the degree of consistency between a previously given weighting pattern and respective patterns specified by the pattern signal groups inputted to the first and second unit ports of the basic unit itself, each of the basic units also operating to modulate the respective signals of the pattern signal groups inputted to the first and second unit ports of the basic unit in accordance with the derived weighting values and to totalize the modulated signals so as to form an output signal outputted from the third unit port of the basic unit itself, said first basic associative unit having its first unit port coupled to receive an input pattern signal group for an object to be recognized, the first to fourth basic associative units being coupled in cascade in the named order in such a manner that the third unit port of an upstream one of each pair of adjacent basic associative units is coupled to the first unit port of a downstream basic associative unit and the third unit port of the downstream basic associative units is coupled to the second unit port of the upstream basic associative unit, said fourth basic associative unit having its second unit port coupled to receive a reference pattern signal group, at least one of the first to fourth basic associative units having its third unit port coupled to one of the first and second unit ports of a non-adjacent downstream one of the basic associative units and further including means for detecting the fact that one of the association units has stabilized the output pattern on its third unit port into a predetermined condition and for inhibiting, for a predetermined time of period, the output of at least one signal processing cell which is included in a group including the association unit having settled its output pattern and association units upstream adjacent to the association unit having settled its output pattern and which cell has an output having reached a predetermined value.

2. A pattern recognition system claimed in claim 1 wherein the time until the signal processing cell is inhibited is different for each of the basic association units.

3. A pattern recognition system claimed in claim 2 wherein the inhibiting time period is different for each of the basic association units.

4. A pattern recognition system claimed in claim 1 wherein each of the signal processing units is set to sharply rise the output level of the second output port when it has exceeded a predetermined level and to maintain its condition for a predetermined time of period unless an inhibit signal is given.

5. A pattern recognition system comprising at least first, second, third, and fourth basic associative units, each unit having at least first and second unit ports for receiving pattern signal groups and a third unit port for outputting a pattern signal group, each of the basic units operating to derive weighting values for respective signals of the pattern signal groups inputted to the first and second unit ports of the basic unit itself in accordance with the degree of consistency between a previously given weighting pattern and respective patterns specified by the pattern signal groups inputted to the first and second unit ports of the basic unit itself, each of the basic units also operating to modulate the respective signals of the pattern signal groups inputted to the first and second unit ports of the basic unit in accordance with the derived weighting values and to totalize the modulated signals so as to form an output signal outputted from the third unit port of the basic unit itself, said first basic associative unit having its first unit port coupled to receive an input pattern signal group for an object to be recognized, the first to fourth basic associative units being coupled in cascade in the named order in such a manner that the third unit port of an upstream one of each pair of adjacent basic associative units is coupled to the first unit port of a downstream basic associative unit and the third unit port of the downstream basic associative units is coupled to the second unit port of the upstream basic associative unit, said fourth basic associative unit having its second unit port coupled to receive a reference pattern signal group, at least one of the first to fourth basic associative units having its third unit port coupled to one of the first and second unit ports of a non-adjacent downstream one of the basic associative units, and wherein the first to fourth basic association units are set to have different time constants which allow such an operation that when the pattern input signal group is given from an external, the conditions of each pair of adjacent association units are sequentially settled from the downstream side association unit of the association unit pair.

6. A pattern recognition system comprising at least first, second, third, and fourth basic associative units, each unit having at least first and second unit ports for receiving pattern signal groups and a third unit port for outputting a pattern signal group, each of the basic units operating to derive weighting values for respective signals of the pattern signal groups inputted to the first and second unit ports of the basic unit itself in accordance with the degree of consistency between a previously given weighting pattern and respective patterns specified by the pattern signal groups inputted to the first and second unit ports of the basic unit itself, each of the basic units also operating to modulate the respective signals of the pattern signal groups inputted to the first and second unit ports of the basic unit in accordance with the derived weighting values and to totalize the modulated signals so as to form an output signal outputted from the third unit port of the basic unit itself, said first basic associative unit having its first unit port coupled to receive an input pattern signal group for an object to be recognized, the first to fourth basic associative units being coupled in cascade in the name order in such a manner that the third unit port of an upstream one of each pair of adjacent basic associative units is coupled to the first unit port of a downstream basic associative unit and the third unit port of the downstream basic associative units is coupled to the second unit port of the upstream basic associative unit, said fourth basic associative unit having its second unit port coupled to receive a reference pattern signal group, at least one of the first to fourth basic associative units having its third unit port coupled to one of the first and second unit ports of a non-adjacent downstream one of the basic associative units, and wherein at least some of the first two fourth basic association units are set to have different time constants from other of the first two fourth basic association units.

7. A pattern recognition system claimed in claim 6, wherein each of basic associative units has its first and second unit ports having respective gains individually set for respective inputs from another basic associative unit.

8. A pattern recognition system claimed in claim 6 wherein the fourth basic associative unit has its third unit port coupled to one of the first and second unit ports of one of the basic associative units which is positioned in the upstream direction of the fourth basic associative unit and not adjacent to the fourth basic associative unit.

9. A pattern recognition system claimed in claim 6 wherein the first to fourth basic association units are set to repeatedly execute such an operation that when the pattern input signal group is given from an external, the condition of the third unit ports of each basic association unit to the first unit port of the downstream adjacent basic association unit is sequentially stabilized in the order of the first to fourth basic association units, and thereafter, the condition of the third unit ports of each basic association unit to the second unit port of the upstream adjacent basic association unit is sequentially stabilized in the order of the fourth to first basic association units.

* * * * *